(12) United States Patent
Kanaujia et al.

(10) Patent No.: US 10,033,979 B2
(45) Date of Patent: Jul. 24, 2018

(54) VIDEO SURVEILLANCE SYSTEMS, DEVICES AND METHODS WITH IMPROVED 3D HUMAN POSE AND SHAPE MODELING

(71) Applicant: AVIGILON FORTRESS CORPORATION, Vancouver (CA)

(72) Inventors: Atul Kanaujia, Herndon, VA (US); Niels Haering, Reston, VA (US); Mun Wai Lee, Ashburn, VA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 1155 days.

(21) Appl. No.: 13/843,455

(22) Filed: Mar. 15, 2013

(65) Prior Publication Data

US 2013/0250050 A1 Sep. 26, 2013

Related U.S. Application Data

(60) Provisional application No. 61/614,623, filed on Mar. 23, 2012.

(51) Int. Cl.
| | |
|---|---|
| *H04N 13/00* | (2018.01) |
| *H04N 7/18* | (2006.01) |
| *G06K 9/00* | (2006.01) |
| *G06T 7/73* | (2017.01) |
| *G06T 7/12* | (2017.01) |

(52) U.S. Cl.
CPC ..... *H04N 13/0007* (2013.01); *G06K 9/00369* (2013.01); *G06T 7/12* (2017.01); *G06T 7/75* (2017.01); *H04N 7/181* (2013.01); *H04N 7/188* (2013.01)

(58) Field of Classification Search
CPC .. G06K 9/00369; G06T 7/0042; G06T 7/0079
USPC .......................................................... 348/42
See application file for complete search history.

(56) References Cited

U.S. PATENT DOCUMENTS

| | | | | |
|---|---|---|---|---|
| 2005/0002561 | A1* | 1/2005 | Monachino et al. | 382/159 |
| 2009/0232353 | A1* | 9/2009 | Sundaresan et al. | 382/103 |
| 2010/0111370 | A1* | 5/2010 | Black et al. | 382/111 |
| 2011/0267344 | A1* | 11/2011 | Germann et al. | 345/420 |
| 2012/0207346 | A1* | 8/2012 | Kohli et al. | 382/103 |

* cited by examiner

*Primary Examiner* — Jamie Atala
*Assistant Examiner* — Kathleen Nguyen
(74) *Attorney, Agent, or Firm* — Muir Patent Law, PLLC

(57) ABSTRACT

A video surveillance system, device and methods may accurately model the shape of a human object monitored by a video stream. 3D human models, such as a coarse 3D human model and a detailed 3D human model may be estimated by mapping individual body part components to a frame. For example, a coarse 3D human model may be obtained by mapping the cylindrical body parts to a plurality of skeleton pose estimates on a part by part basis. A detailed 3D human model may be estimated by mapping detailed human body parts to respective the cylindrical body parts of the coarse 3D human model on a part by part basis. The detailed 3D human model may be used to detect accessories of the human object being monitored, as well as overall dimensions, body part dimensions, age, and gender of the human object being monitored.

31 Claims, 18 Drawing Sheets

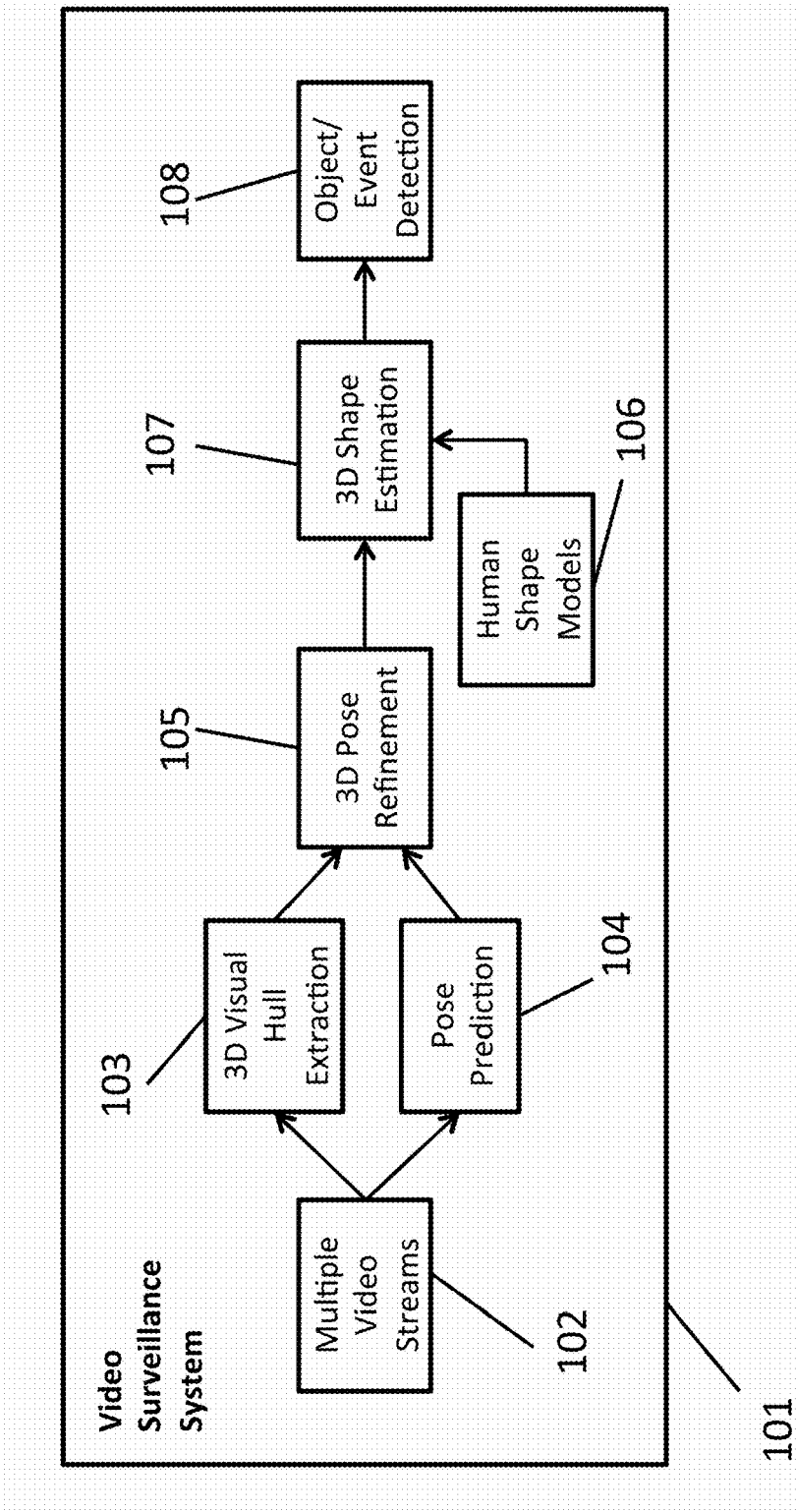

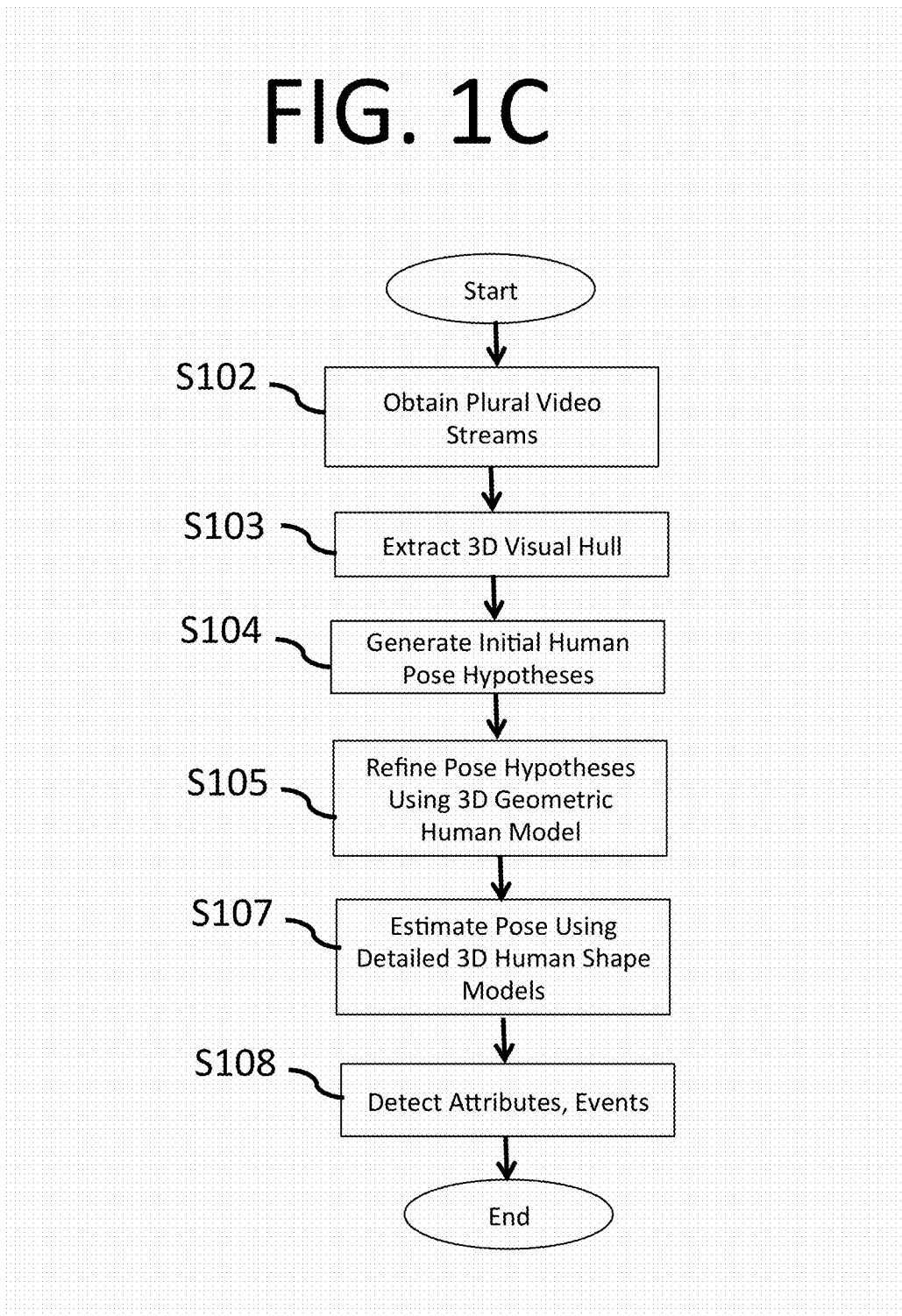

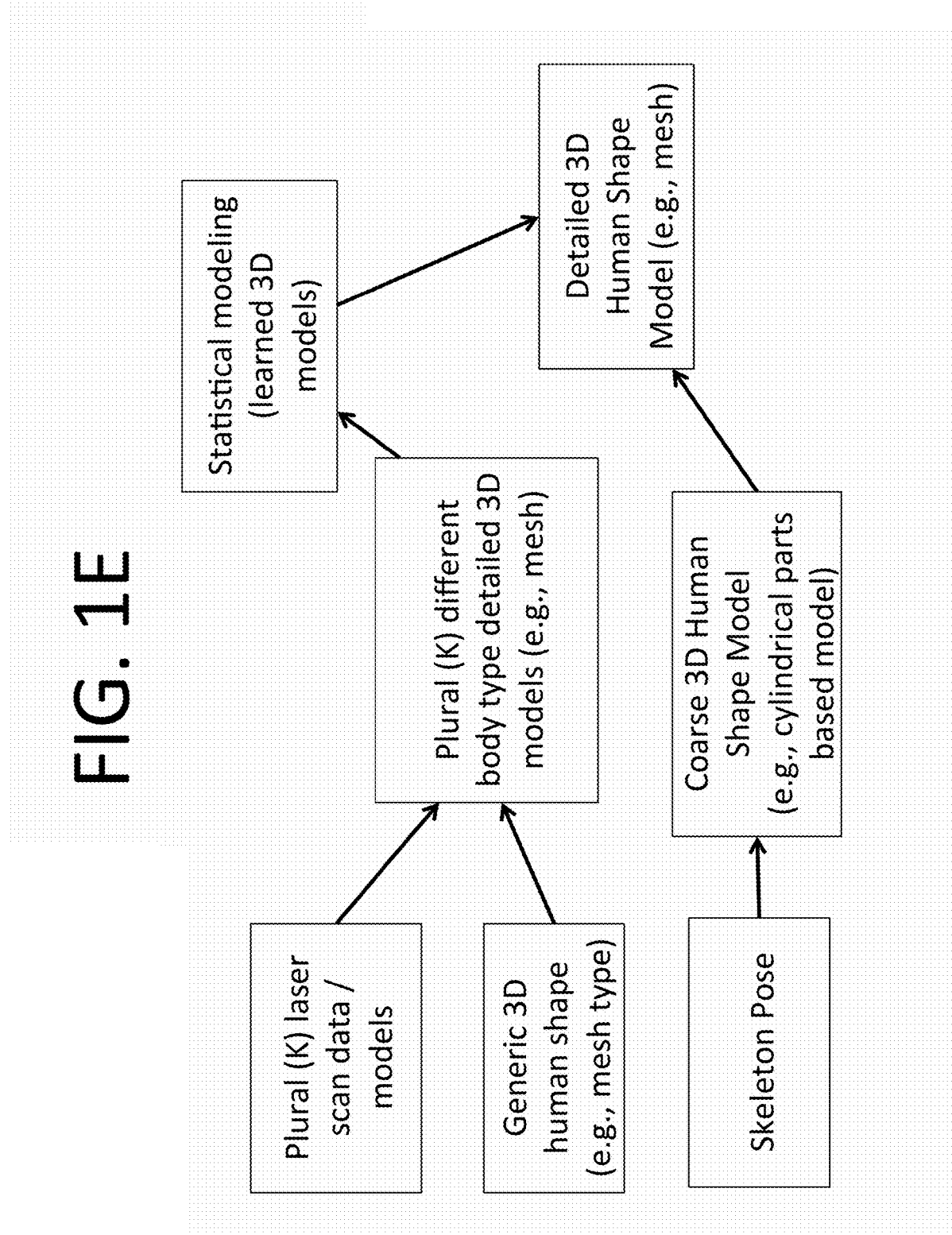

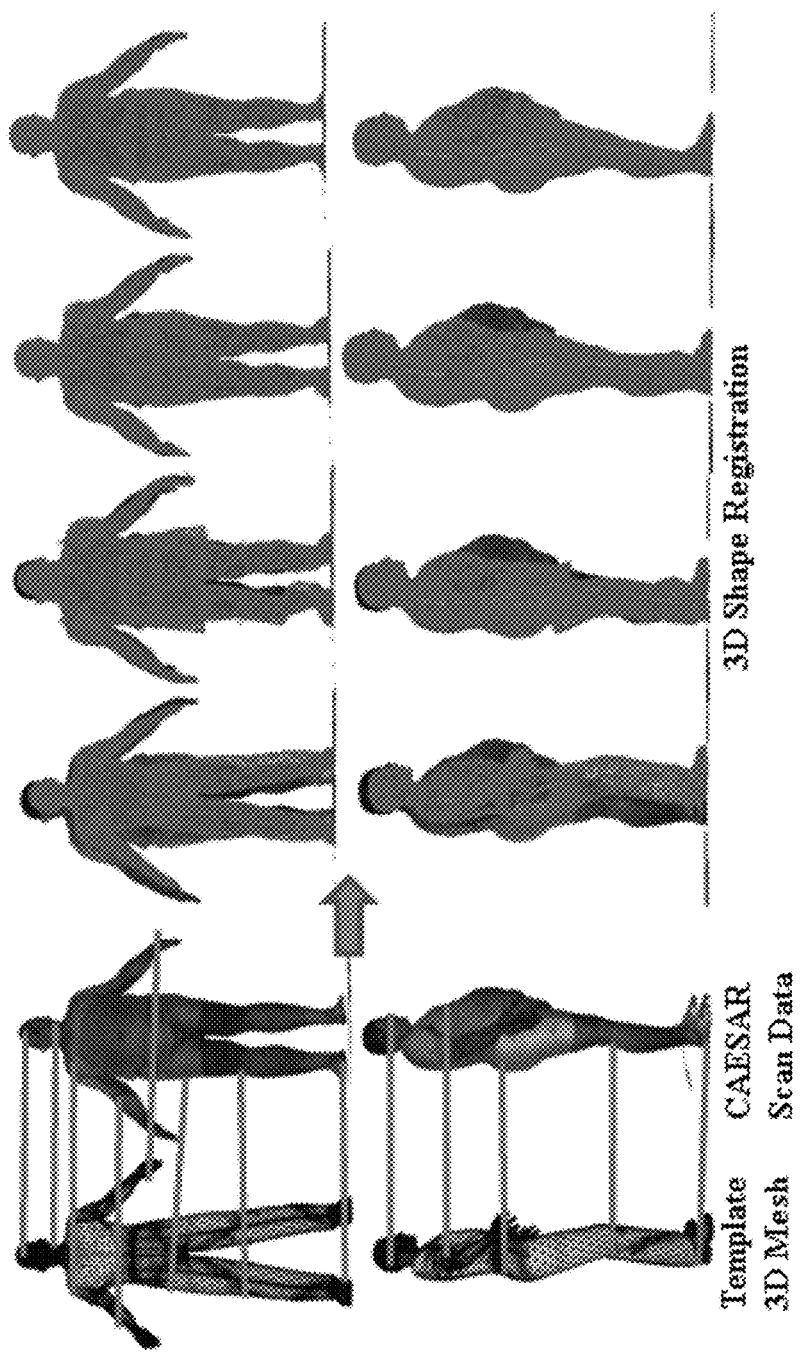

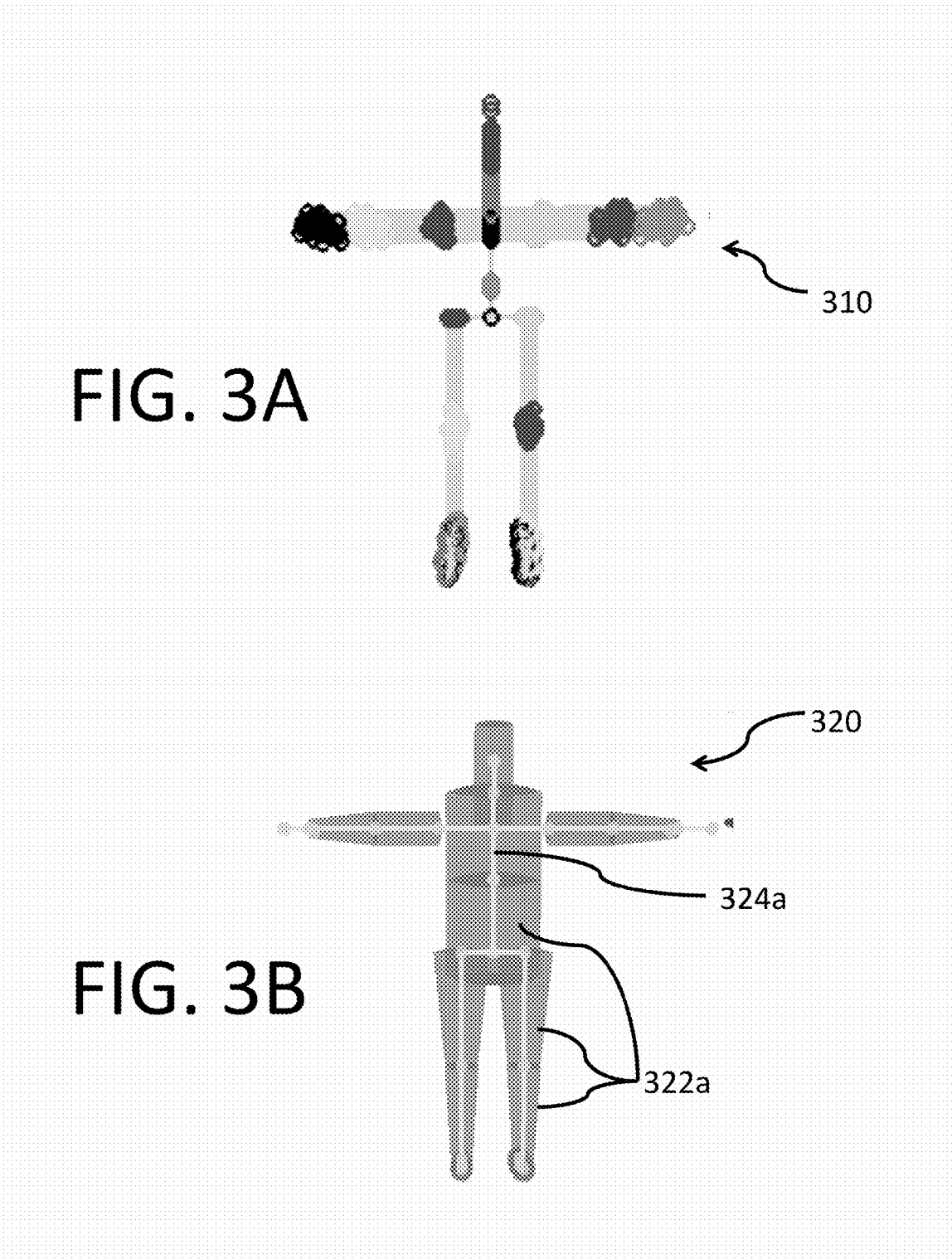

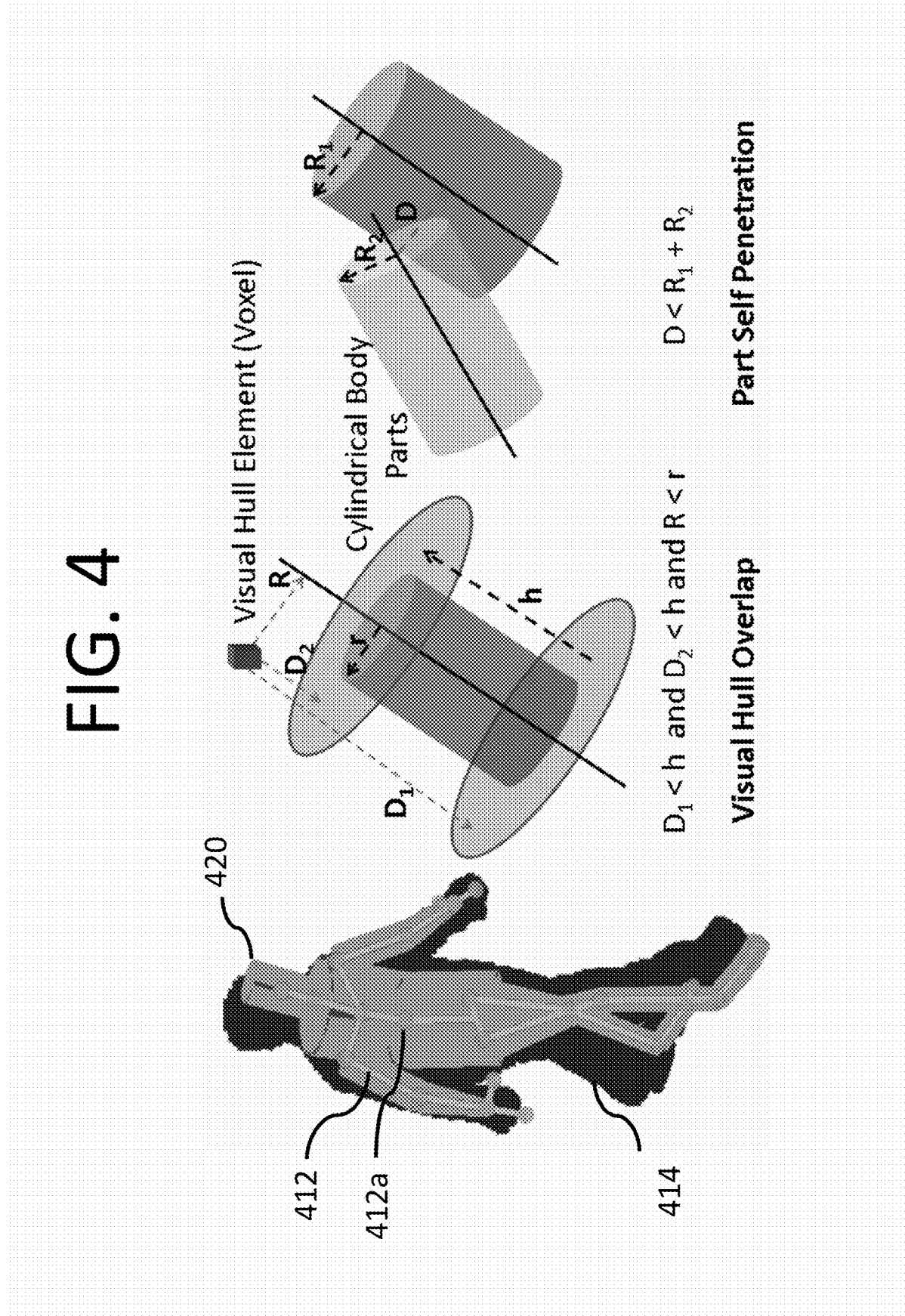

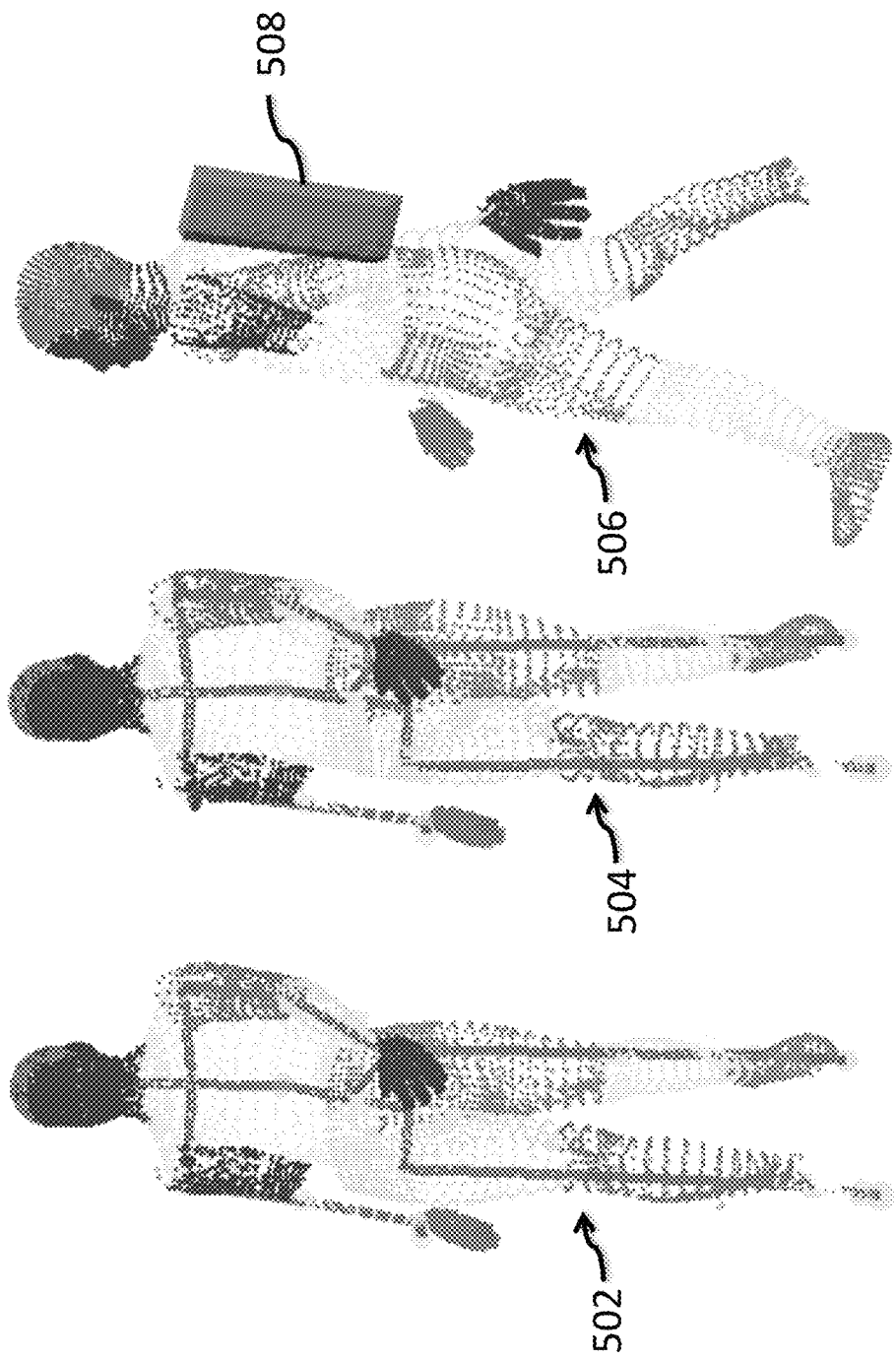

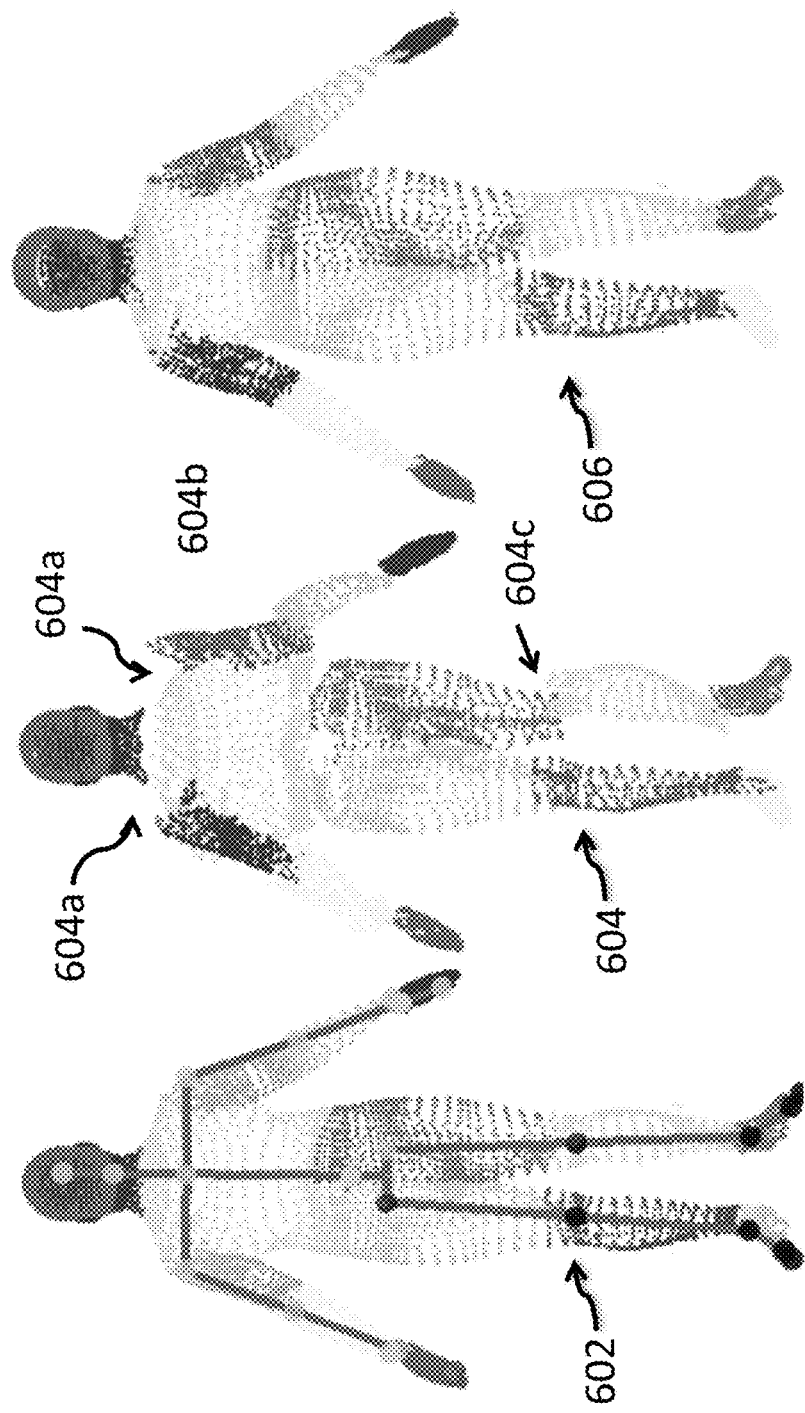

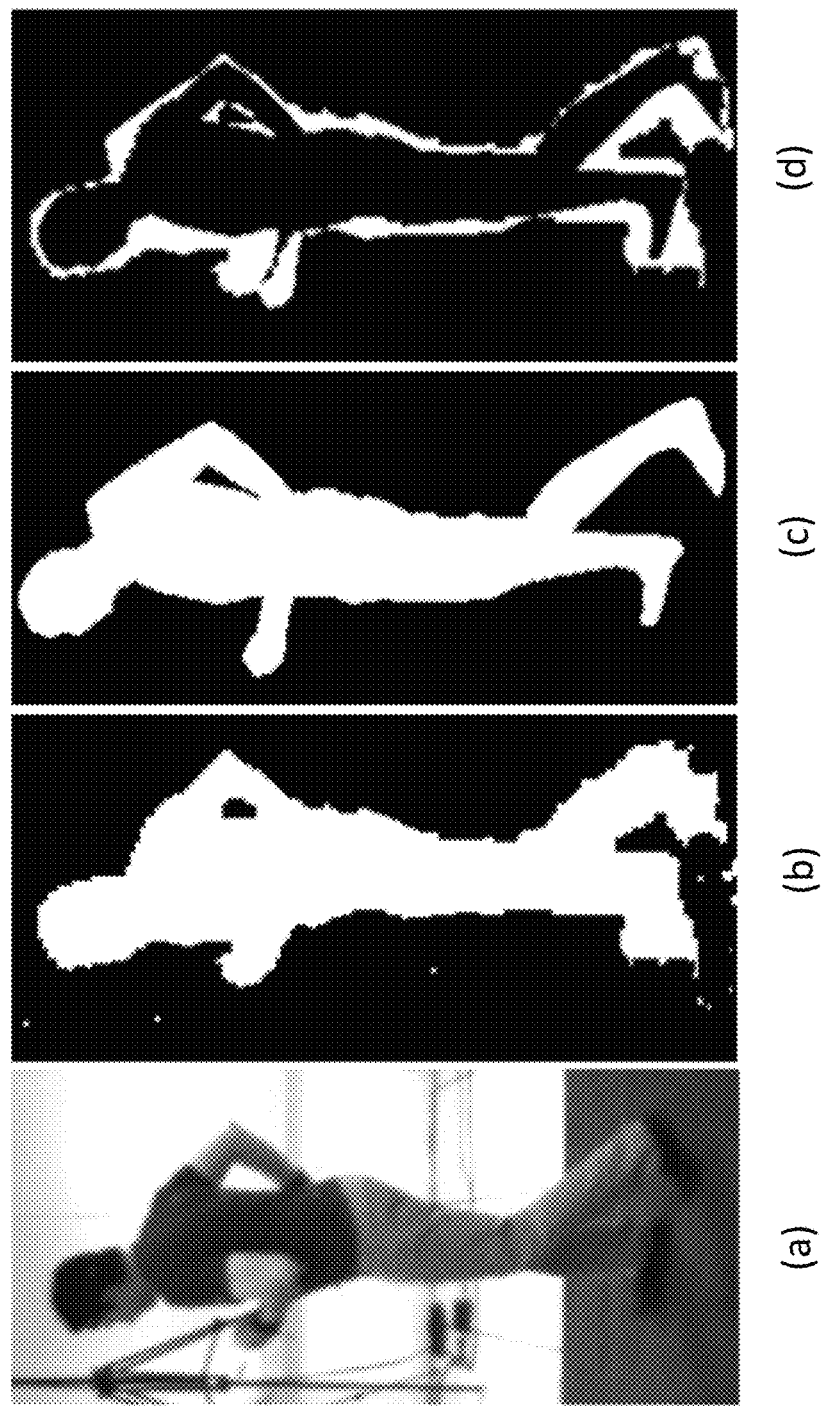

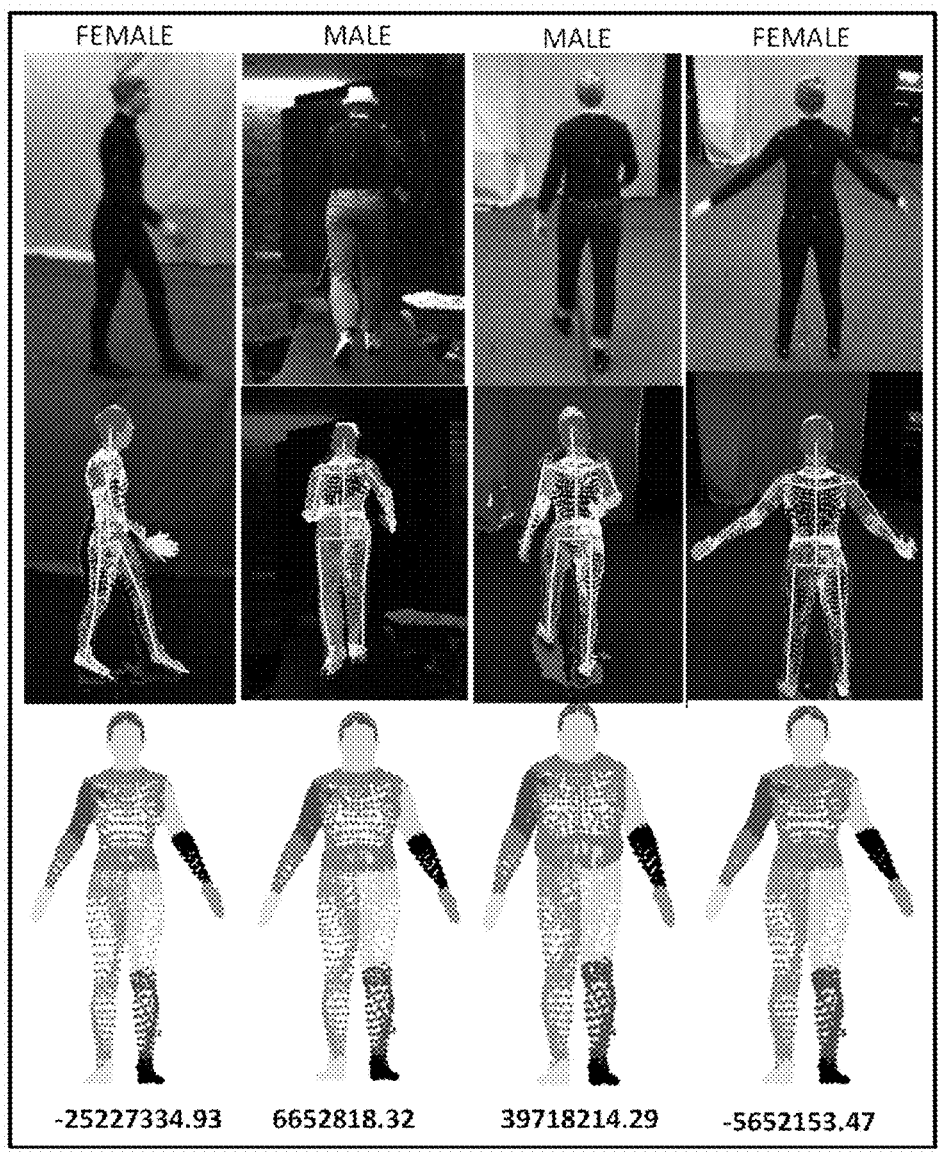

FIG. 10C

| Body Part | Dimensions (in cm) |
|---|---|
| Left Upper Leg Width | 16.3331 |
| Left Upper Leg Length | 27.9589 |
| Left Knee Height | 45.3623 |
| Left Upper Arm Width | 9.453 |
| Left Upper Arm Length | 26.957 |
| Left Lower Arm Width | 6.1996 |
| Left Lower Arm Length | 26.1762 |

VIDEO SURVEILLANCE SYSTEMS, DEVICES AND METHODS WITH IMPROVED 3D HUMAN POSE AND SHAPE MODELING

CROSS-REFERENCE TO RELATED APPLICATION

This application claims the benefit of priority to U.S. Provisional Patent Application No. 61/161,623, filed Mar. 23, 2012, the contents of which are incorporated herein by reference in their entirety.

BACKGROUND

1. Field

Intelligent Video Surveillance (IVS) systems may be used to detect events of interest in video feeds in real-time or offline (e.g., by reviewing previously recorded and stored video). Typically, this task may be accomplished by detecting, tracking and/or analyzing targets of interest. This disclosure relates to video surveillance, such as video surveillance methods and systems and video verification methods and systems. Video surveillance systems, devices and methods are disclosed that may analyze video images to provide more models of detected human objects within the video, including modeling of the shape and pose of the detected human objects. Accessories of the human objects in the video image may be detected and modeled.

2. Background

With advancements in computer vision technology and the emergence of matured technologies for detection and tracking of human targets from a significant stand-off point, there is a greater need for cognitive video analytics with the ability to infer subtle attributes of humans and analyze human behavior. Initial work on marker-less motion-capture focused on accurate 3D pose estimation from single and multi-view imagery. A comprehensive survey of existing state of the art techniques in vision-based motion capture is provided by T. B. Moeslund, A. Hilton and V. Kruger in "A Survey of Advances in Vision-Based Human Motion Capture and Analysis," (*Computer Vision and Image Understanding*, 104(2-3):90-126, 2006). Bregler and Malik in "Twist Based Acquisition and Tracking of Animal and Human Kinematics," (*International Journal of Computer Vision*, 56(3):179-194, 2004) proposed a representation for articulated human models using twists that has been widely employed in a number of single and multiple camera based motion capture systems. Compared to earlier approaches that modeled human shapes with cylindrical or superquadrics parts, current methods use more accurate modeling of 3D human shapes using SCAPE body models (see, e.g., A. O. Balan and M. J. Black "The Naked Truth: Estimating Body Shape Under Clothing" (*ECCV* (2), pages 15-29, 2008)) or CAESAR dataset (see, e.g., B. Allen, B. Curless, and Z. Popovic "The Space of Human Body Shapes: Reconstruction and Parameterization from Range Scans," (ACM SIGGRAPH, 2003)). A number of recent multi-camera based systems proposed by Balan and Sigal employed SCAPE data to model variability in 3D human shapes due to anthropometry and pose. They have used these shape models to estimate human body shape under loose clothing and also efficiently track across multiple frames. Guan et. al. in "Estimating Human Shape and Pose from a Single Image," (*ICCV, pages* 1381-1388. IEEE, 2009) used SCAPE based shape model to perform height-constrained estimation of body shape. However, these approaches lack an articulated skeleton underlying the human body shape. The 3D shape deformation of body surface is captured by tracking the 3D mesh surfaces directly. Deforming the 3D mesh while maintaining the surface smoothness is not only computationally demanding but also ill-constrained, occasionally causing poor surface deformation due to noisy silhouettes (or visual hull).

Other approaches include:

L. Mundermann, S. Corazza and T. P. Andriacchi "Accurately Measuring Human Movement Using Articulated ICP with Soft-Joint Constraints and a Repository of Articulated Models" (*CVPR*, IEEE Computer Society, 2007).

J. Gall, C. Stoll, E. de Aguiar, C. Theobalt, B. Rosenhahn and H. P. Seidel "Motion Capture Using Joint Skeleton Tracking and Surface Estimation" (*IEEE Computer Society Conference on Computer Vision and Pattern Recognition*, pages 1746-1753, 2009).

C. Stoll, J. Gall, E. de Aguiar, S. Thrun, and C. Theobalt "Video-Based Reconstruction of Animatable Human Characters" (*ACM Trans. Graph.*, 29(6):139, 2010)

J. Gall, A. Yao and L. J. V. Gool. "2d Action Recognition Serves 3d Human Pose Estimation" (*ECCV* (3), pages 425-438, 2010)

G. Pons-Moll, A. Baak, T. Helten, M. Muller, H. P. Seidel and B. Rosenhahn. "Multisensor-Fusion for 3d Full-Body Human Motion Capture" (*CVPR*, pages 663-670, 2010)

Y. Chen, T. K. Kim and R. Cipolla "Inferring 3d Shapes and Deformations from Single Views" (*ECCV* (3), pages 300-313, 2010)

Some of these approaches develop a model with an underlying skeleton. However, detailed 3D human shape estimation from multi-view imagery is still a difficult problem that does not have satisfactory solution. The articles referenced in this disclosure are all incorporated by reference in their entirety.

The embodiments described here address some of these problems of existing systems.

SUMMARY

The disclosed embodiments provide methods, devices and systems for intelligent analysis of video images to detect objects, such as human objects.

In certain embodiments, a method of detecting human objects in a video, comprises receiving plural video streams, each video steam providing a series of video images of a monitored location; detecting a human object within the video images; determining a three dimensional (3D) hull corresponding to the human object within the video images; determining initial pose hypotheses of the human object within the video images, the initial pose hypotheses comprising a plurality of pose predictions each associated with a first probability value; mapping a plurality of simple geometric volumes to each of the pose predictions of the initial pose hypotheses to obtain a plurality of corresponding coarse 3D human models; comparing each of the corresponding coarse 3D human models to the 3D hull; in response to the comparing of each of the corresponding coarse 3D human models to the 3D hull, modifying pose predictions of the initial pose hypotheses to obtain refined pose hypotheses; for each of the pose predictions of the refined pose hypotheses, mapping at least one standard human model to a coarse 3D human model associated with the pose prediction to obtained an associated refined 3D human model; comparing each of the refined 3D human models to at least one of the video images to select an optimum 3D human model as representing the human object detected within the video images; and based on the selected optimum 3D human model, automatically detecting at least one of an event represented within at least one of the video images, a characteristic of the human object and a second object within at least one of the video images.

Each pose prediction of the initial pose hypotheses and the refined pose hypotheses may comprise a pose describing 3D orientations of human body parts and a probability associated with the corresponding pose.

The 3D orientations of human body parts of each pose may be represented by a skeleton model comprising plural skeleton body segments, each skeleton body segment of the skeleton model being associated with 3D coordinates describing an associated 3D orientation.

The plural skeleton body segments of the skeleton model may be connected to each other at joint locations.

Modifying the pose predictions of the initial pose hypotheses to obtain the refined pose prediction hypotheses may comprise modifying at least some of the first probability values associated with the pose predictions of the initial pose hypotheses to obtain second probability values, each of the second probability values being associated with a corresponding pose prediction of the refined pose hypotheses.

Modifying pose predictions of the initial pose hypotheses to obtain the refined pose prediction hypotheses comprises selecting a sub-set of the pose predictions of the initial pose hypotheses to form a pose predictions of the refined pose hypotheses.

The 3D hull may be represented as a three dimensional volume.

Mapping the simple geometric volumes to each of the pose predictions of the initial pose hypotheses to obtain a corresponding coarse model may comprise, for each of the pose predictions of the initial hypotheses, mapping a body part geometric volume to a corresponding skeleton body part segment for each of plural skeleton body part segments of a skeleton model representing the pose of the corresponding pose prediction.

Mapping a body part geometric volume to a corresponding skeleton body part may comprise mapping the body part geometric volume with different sizes to the corresponding skeleton body part and determining an associated likelihood value.

The likelihood value may be used to adjust a probability associated with the corresponding pose associated with coarse 3D human model.

The likelihood value may be determined by comparing the corresponding body part geometric volume to the 3D hull.

Mapping at least one standard human model to the coarse 3D human model may comprise, for each of the pose predictions of the refined pose hypotheses, mapping a body part of the standard human model to a corresponding geometric volume of the coarse 3D human model.

Mapping of a body part of the standard human model to a corresponding geometric volume may comprise individual adjustment of the size of the body part of the standard human model.

Mapping of the at least one standard human model to the coarse 3D human model is may be performed on a part by part basis.

Mapping the simple geometric volumes to each of the pose predictions may comprise mapping a body part geometric volume to a corresponding portion of a pose of the pose prediction.

The method may also comprise, for each of the pose predictions of the refined pose hypotheses, mapping plural standard human models to a coarse 3D human model associated with the pose prediction to obtain plural associated refined 3D human models for each pose prediction of the refined posed hypotheses, each of the plural standard human models representing a different human body type.

Comparing each of the refined 3D human models to at least one of the video images to select an optimum 3D human model as representing the human object detected within the video images may comprise calculating a silhouette of each of the refined 3D human models; extracting a silhouette from a video image of the video image streams; and comparing the calculated silhouettes to the extracted silhouette.

Calculating a silhouette of each of the refined 3D human models may comprise projecting a corresponding one of the refined 3D human models from a three dimensional space to a two dimensional image plane of one of the video images.

Comparing each of the refined 3D human models to at least one of the video images to select an optimum 3D human model as representing the human object detected within the video images may comprise, for each of the refined 3D human models, calculating a first silhouette by projecting a corresponding refined 3D human model from a three dimensional space to a two dimensional image plane of a first video image of the video images; for each of the refined 3D human models, calculating a second silhouette by projecting a corresponding refined 3D human model from a three dimensional space to a two dimensional image plane of a second video image of the video images; extracting a first extracted silhouette from the first video image; extracting a second extracted silhouette from the second video image; comparing the first silhouette to the first extracted silhouette; and comparing the second silhouette to the second extracted silhouette.

The detected characteristic may comprise a size of the human object, a gender of the human object, a race of the human object, or an age of the human object.

Automatically detecting a second object may comprise detecting an accessory object attached to the human object.

At least some of the coarse 3D human models may comprise an accessory model part.

The methods may further comprise, for at least some of the coarse 3D human models, obtaining a coarse 3D human-accessory model by mapping an accessory simple geometric volume to a position correlated to a pose of the corresponding pose prediction.

Each pose prediction of the initial pose hypotheses comprises a pose describing 3D orientations of human body parts, a 3D orientation of an accessory, and a probability associated with the corresponding pose.

The 3D orientations of human body parts and the accessory of each pose may be represented by a skeleton model comprising plural skeleton body segments and an accessory segment, each segment of the skeleton model being associated with 3D coordinates describing an associated 3D orientation.

Methods may comprise receiving plural video streams, each video steam providing a series of video images of a monitored location; detecting a human object within the video images; determining a coarse 3D human model representing the human object; mapping at least one standard human model to the coarse 3D human model on a human part by part basis to obtain a refined 3D human model, based on the mapping, automatically detecting at least one of an event represented within at least one of the video images, a characteristic of the human object and a second object within at least one of the video images.

Methods may comprise receiving plural video streams, each video steam providing a series of video images of a monitored location; detecting a human object within the video images; determining a pose of the human object within the video images, mapping a plurality of simple geometric volumes to the pose to obtain a coarse 3D human-accessory combined model, and mapping at least one standard human model to a coarse 3D human-accessory model associated with the pose prediction to obtained an associated refined 3D human-accessory combined model; and based on the mapping of at least one standard human model to a coarse 3D human-accessory model, automatically detecting at least one of an event represented within at least one of the video images, a characteristic of the human object and a second object within at least one of the video images.

System and devices are disclosed which may be configured to perform such methods.

Computer readable media containing software that may be used to configure a computer to perform the operations described herein and comprise further embodiments of the invention.

BRIEF DESCRIPTION OF THE DRAWINGS

Example embodiments will be more clearly understood from the following detailed description taken in conjunction with the accompanying drawings. The figures represent non-limiting example embodiments as described herein.

FIG. 1A illustrates an exemplary video surveillance system 101 according to embodiments of the invention.

FIG. 1C illustrates an exemplary method according to some embodiments.

FIG. 1E illustrates an option where the mapping of the K different body type detailed 3D models includes modification of certain aspects of the different body type detailed 3D models.

FIG. 2 shows an example of a 3D shape registration where a 3D mesh surface and underlying skeleton of a template human model is iteratively deformed to align the 3D mesh surface and underlying skeleton to human body scan data.

FIG. 3A illustrates an example of the space of articulated human skeletons.

FIG. 3B illustrates an example of a course 3D human shape model.

FIG. 4 illustrates aspects of mapping cylindrical body parts to a pose.

FIG. 5 illustrates an example of deforming a 3D mesh.

FIG. 6 illustrates an example of detailed 3D shape fitting.

FIG. 7 illustrates aspects of comparing a rendered silhouette and an observed silhouette.

FIG. 10A shows the gender classification results. FIG. 10C illustrates measurements of different body parts.

DETAILED DESCRIPTION

Figure 1B:
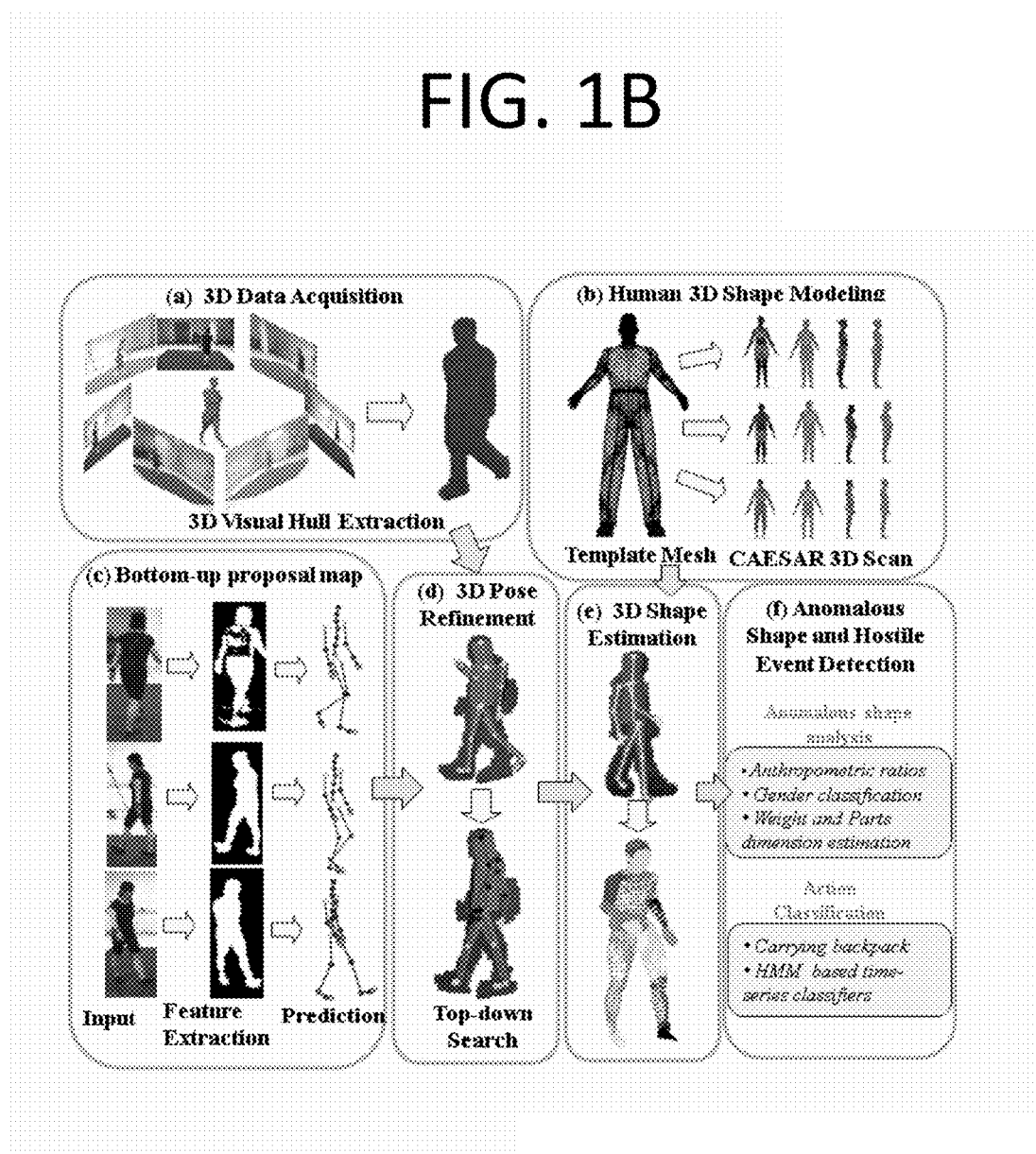
FIG. 1B shows representations of the operations of video surveillance system 101.

Various exemplary embodiments will be described more fully hereinafter with reference to the accompanying drawings, in which some exemplary embodiments are shown. The present invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions. In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

FIG. 1A illustrates an exemplary video surveillance system 101 according to embodiments of the invention. FIG. 1B shows representations of the operations of video surveillance system 101. FIG. 1C illustrates an exemplary method according to some embodiments. The method of FIG. 1C may be implemented by the video surveillance system 101 described herein. The individual steps of the method of FIG. 1C may implement some or all of the exemplary operations of block 102 and modules 103-108 described herein, but need not be limited thereto.

The video surveillance system 101 may be configured to monitor a scene to estimate human shapes of detected human objects in one or more video streams, configured to detect abnormalities associated with the human shape, configured to detect and identify accessories of the detected human object and configured to detect events associated with the human object. The video surveillance system 101 may be implemented with a typical stationary platform IVS system. By way of example, see U.S. Pat. No. 7,868,912 issued to Venetianer et al. and U.S. Pat. No. 7,932,923 issued to Lipton et al., both of which are incorporated herein by reference in their entirety, for exemplary details of an IVS system which may be used to implement the embodiments described here. U.S. Pat. Nos. 7,868,912 and 7,932,923 are also incorporated by reference for exemplary details of video primitive (or metadata) generation and downstream processing (which may be real time processing or later processing) to obtain information from the video, such as event detection, using the generated video primitives, which may be used with the embodiments disclosed herein.

Block 102 provides multiple video streams from multiple video sources. For example, block 102 may comprise three video cameras operating to take a video of an area to be monitored. As another example, block 102 may comprise a storage module (which may be a computer readable medium, such as a hard disk, non-volatile memory, DVD, etc.) that stores video of multiple video cameras that have taken video of an area to be monitored. FIG. 1B illustrates an example of a frame of each of the video streams being provided as inputs to 3D visual hull module (at (a)) and to pose prediction module 104 (at (c)). Operations associated with block 102 described herein may be performed as part of step S103 of the method of FIG. 1C.

Each module 103, 104, 105, 106, 107 and 108 (as well as their components), alone or as combined with other modules, may be implemented by dedicated hardware (circuitry), software and/or firmware. For example, a general purpose computer programmed with software may implement all of the modules. As such, computer readable media containing software that may be used to configure a computer to perform the operations described herein comprise further embodiments of the invention. As another example, a to implement the systems, devices and methods described herein, various computing and optical components may be used, such as one or more of the following: a general purpose computer; supercomputer; a mainframe; a super mini-computer; a mini-computer; a workstation; a microcomputer; a server; an interactive television; a hybrid combination of a computer and an interactive television; a smart phone; a tablet; and application-specific hardware to emulate a computer and/or software. These may include one or more processors, one of more field programmable gate arrays (FPGAs), computer memory, a computer-readable medium such as, for example, any storage device used for storing data accessible by a computer (e.g., a processor may perform various algorithms on data received from a camera device, and a computer memory can then store the information about the various pixels and can store results of blob detection, target detection, and event detection). Examples of a computer-readable medium include: a magnetic hard disk; a floppy disk; an optical disk, such as a CD-ROM and a DVD; a magnetic tape; a memory chip; and a solid state storage device. A tangible computer-readable medium includes computer-readable media, such as listed above, that are physically tangible. In addition, software may be used in combination with the computing and/or optical components to implement the methods described herein. Software may include rules and/or algorithms to operate a computer, and may include, for example, code segments, instructions, computer programs, and programmed logic. The various computers, cameras, and other image equipment described herein can be connected over a network, which may involve permanent connections such as cables or temporary connections such as those made through telephone or other communication links, and also may include wireless communication links. Examples of a network include: an internet, such as the Internet; an intranet; a local area network (LAN); a wide area network (WAN); and a combination of networks, such as an internet and an intranet. The various hardware and software examples described above are also described in greater detail in the patent documents incorporated by reference herein.

3D visual hull extraction module 103 receives plural video streams from block 102 and extracts a 3D visual hull of a human object detected in the plural video streams. FIG. 1B shows six frames of six different video streams taken with different perspectives (different angles) of a monitored area. A human within the monitored area appears as a human object on each of these frames. The video streams are analyzed to detect the human object, and each of the six frames (associated with the same time) shown in (a) of FIG. 1B may be used to extract a 3D visual hull by module 103. While FIG. 1B shows the use of six video streams, more or less video streams may be used. In some embodiments, three or more video streams may be used with the video surveillance system 101.

Pose prediction module 104 receives the plural video streams from block 102 and generates initial human pose hypotheses using features extracted from the plural video streams. The pose hypotheses may be a plurality of poses associated with an associated probability for the human object in the video streams at a particular instant in time (e.g., for a frame of each of the video image streams). FIG. 1B illustrates at (c) inputs of three frames of three respective video streams as an input. Each frame is analyzed to extract features of the detected human object within each frame. The feature extracted represented by (c) in FIG. 1B is a silhouette, but other features may also be extracted, such as identifying locations of certain body parts of the human object. The extracted features are used to generate the pose hypotheses. In FIG. 1B, a skeleton frame is used to model a pose prediction comprising one of the pose hypotheses.

3D pose refinement module 105 receives the 3D visual hull from module 103 and receives pose hypotheses from module 104 and refines the pose predictions. The pose predictions may be refined by the 3D pose refinement module 105 using cylindrical body part models to obtain a coarse 3D human shape model. Note that "cylinder" or derivations thereof (e.g., "cylindrical") as used herein include tapered cylinders (e.g., cones or truncated cones). For example, each of the pose predictions of the pose prediction hypothesis output by module 105 may be represented by a skeleton frame. For each pose prediction, cylinder model parts may be mapped on a part by part basis (e.g., leg, arm, torso, head, etc.) to the skeleton corresponding to the pose prediction. Sizes of the cylinder may be selected by comparing the cylinder to the 3D visual hull to maximize correspondence. The resulting coarse 3D human shape model may be used to help refine the pose predictions by module 105. For example, part self penetration between body parts of the coarse 3D human shape model may reduce a probability value associated with the pose prediction associated with the coarse 3D human shape model. The refined posed hypotheses and corresponding coarse 3D human shape model are provided to 3D shape estimation module 107. FIG. 1B represents the operations of 3D pose refinement module 105 at (d), showing cylindrical human body parts mapped to portions of the skeleton representing a pose prediction. The resulting coarse 3D human shape model is compared to the visual hull extracted from module 103 to refine the prose predictions. In addition, or in the alternative, other comparisons of the coarse 3D human shape model may be made with the video images, such as a comparison of a calculated silhouette to a silhouette extracted from a corresponding video image frame. Such comparisons may be made for each of the different pose predictions of the pose hypotheses output by module 104 (corresponding to (c) in FIG. 1B) and used to modify the pose hypotheses output by module 104. For examples, probabilities associated with each of the poses may be adjusted.

Module 106 represents a database of a plurality of different body type detailed 3D human shape models. The different body type detailed 3D human shape models in the database of module 106 may have been previously derived from laser scan data obtained from laser scans of human subjects, so that a wide representation of typical human body shapes may be stored therein. For example laser scan data providing detailed location information of a scanned human subject may be translated to a mesh-type human model (having surface geometric elements, or mesh elements) representing the a particular body type detailed 3D human shape model. FIG. 1B shows in (b) a plurality of different body type detailed 3D human shape models obtained from scanning. Each of the different body type detailed 3D human shape models represents a different body type that may be normally found in the real world (e.g., muscular, lanky, fat, skinny, short, tall, body types having different fat distribution locations, large or small hip size to the body, large or small head size to the body, etc.). Module 106 may also include statistical modeling sub-module that may provide applied to the different body type detailed 3D human shape models to provide variations of the shapes of the body parts of the different body type detailed 3D human shape models, which may correspond to the learned 3D human shape models described herein. It should be noted however that for the purposes of this application, description of use of the different body type detailed 3D human shape models (or equivalents) contemplates use of these detailed 3D human shape models with or without modification (e.g., it would include using the learned 3D human shape models). For example, description of mapping a body type detailed 3D human shape model to a coarse 3D human model contemplates use of a modified or unmodified detailed 3D human shape model (e.g., use of a learned 3D shape model).

3D shape estimation module 107 receives the refined pose estimations from module 105 and receives the different body type detailed 3D human shape models from module 106 and provides an estimated pose and a detailed 3D model of the human object detected in the video streams. The estimated pose may be estimated by mapping each of the different body type detailed 3D human shape models from module 106 to each of several refined pose predictions (provided by module 105) to obtain a corresponding detailed 3D human shape model. FIG. 1B represents this operation at (e), showing a coarse 3D shape human model provided by module 105 (at top of (e)) transformed into a detailed 3D shape human model (at the bottom of (e)). Each of the individual body parts of the different body type detailed 3D human shape models from module 106 (such as head, torso, arm, leg, foot, etc.) may be separately mapped to a corresponding body part represented by the coarse 3D human shape model provided by module 105. Each of the body parts of the different body type detailed 3D human model may be separately adjusted in size when mapping the different body type detailed human shape models from module 106 to the coarse 3D human shape model associated with the refined pose prediction. Using the detailed 3D human shape models obtained by mapping the different body type detailed 3D human shape models to each of several pose predictions (via the associated coarse 3D human shape model), for each video stream of the plural video streams, a calculated silhouette of the detailed 3D human shape model may be compared to a silhouette extracted from the video image frame of that video stream. The calculated silhouetted may correspond to a projection of the detailed 3D human shape model to the image plane of the corresponding video image from which the actual silhouette is extracted. The estimated pose and shape of the human object may be determined as that which results in the best comparison of the calculated silhouette and the extracted silhouettes.

The estimated pose and shape of the human object (which may be the best matching detailed 3D human shape model) may be provided to object and/or event detection module 108. Module 108 may use the estimated pose and shape of the human object to automatically identify disproportionate body parts, detecting accessories (e.g., a backpack, suitcase, purse, etc.), the size of the detected accessories, and/or to infer attributes of the human object, such as gender, age and ethnicity. FIG. 1B represents such possible detections at (f).

FIG. 1C illustrates an exemplary method according to some embodiments. The method may be implemented by the video surveillance system 101 described herein. In step S102, plural video streams of a monitored area are obtained. These video streams may be received directly from a video camera or retrieved from a computer readable medium. Operations performed by module 102 described herein may also be part of step S102.

In step S103, a 3D visual hull is extracted from the plural video streams of a human object detected in the plural video streams. Operations associated with module 103 described herein may also be performed as part of step S103 of the method of FIG. 1C.

In step S104, initial pose hypotheses of the human object are generated through analyses of the video images of the video streams. The initial pose hypotheses may be in the form of plural skeleton poses associated with a corresponding probability calculation. Operations associated with module 104 described herein may also be performed as part of step S104 of the method of FIG. 1C.

In step S105, the initial pose hypotheses are refined. This may include generation of a coarse 3D human shape model for each pose and comparing the same to the extracted 3D visual hull obtained in step S103. Other calculations may be made to compare the coarse 3D human shape model to the human object in the video images to refine the pose hypotheses. For example, the coarse 3D human shape model have a calculated silhouette compared with silhouettes of the human object for each of the plural video images of the video streams to refine the initial pose hypotheses. The coarse 3D human model may be generated by mapping simple geometric human body parts (such as cylinders) to skeleton forms representing poses of the pose hypotheses. Operations associated with module 105 described herein may also be performed as part of step S105 of the method of FIG. 1C.

In step S107, a final pose and shape is estimated. The pose and shape may be estimated by using different body type detailed 3D human models (e.g., having an exterior form represented by mesh type geometries obtained by scanning actual humans to determine a variety of typical human shapes). Plural different body type detailed 3D human models may each be mapped to plural coarse 3D human models (associated with the refined pose hypotheses) on a human part by part basis to the coarse 3D human model to allow for each part to be sized and positioned individually. For example, each leg, arm head, foot, hand, torso head, etc. of the different body type detailed 3D human models may be separately mapped to the coarse 3D human models. Plural detailed 3D human models for each of the plural coarse 3D human models may thus be obtained. Selection of the final estimated 3D model is made by comparing the detailed 3D human models to the silhouette to also obtain an associated pose. Operations associated with module 107 described herein may also be performed as part of step S107 of the method of FIG. 1C.

In step S108, attributes and/or events are detected using the estimated pose and shape, such as those described herein with respect to module 108. While FIG. 1C illustrates steps performed in a certain order, the method is not restricted thereto. For example, steps S104 and S103 may be performed in parallel, or with step S104 performed prior to step S103. Additional steps may also be performed other than those described. For example, the method may also include laser scanning human subjects and obtaining the different body type detailed 3D human models from these laser scans.

Figure 1D:
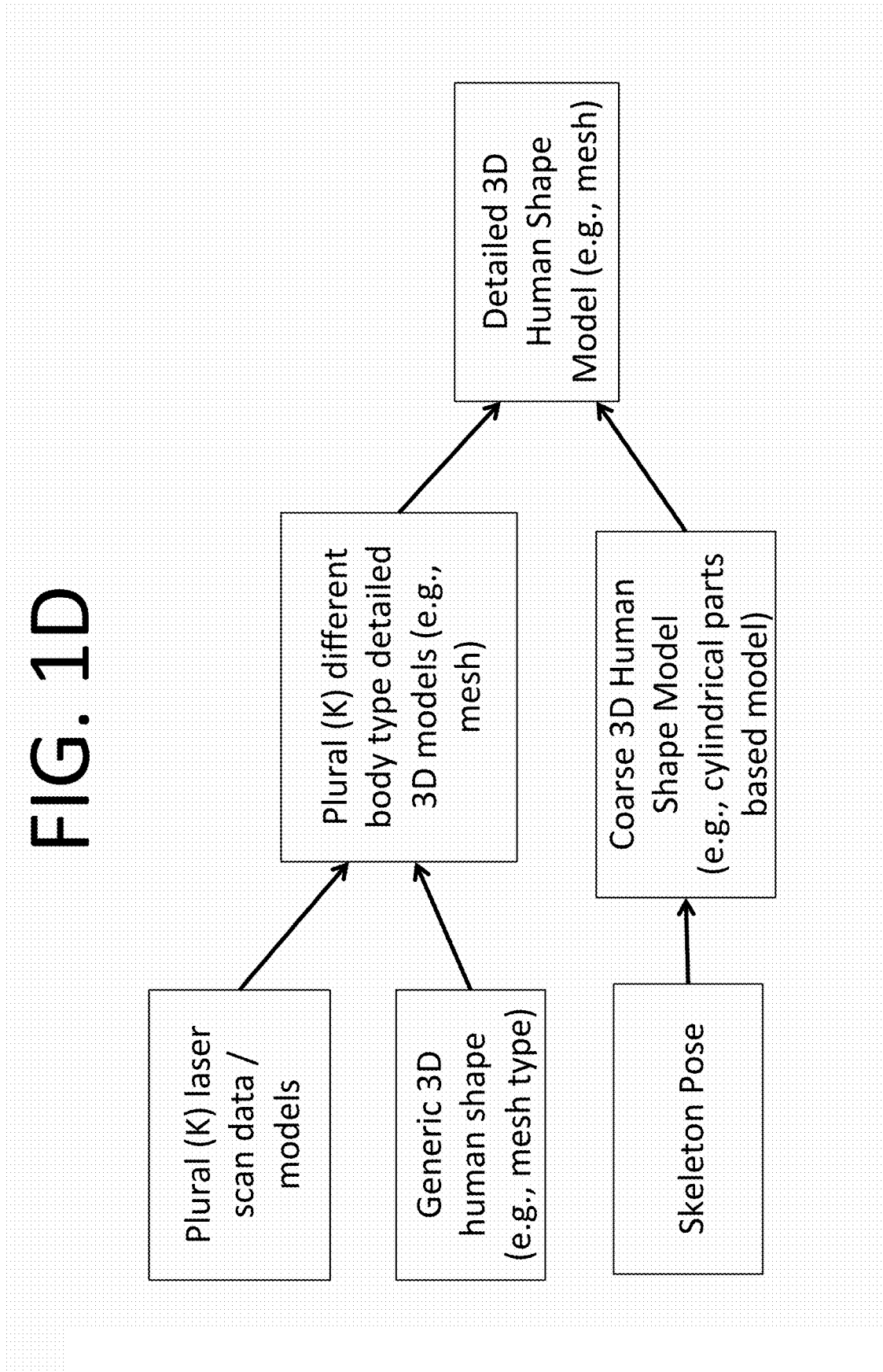
FIG. 1D illustrates an exemplary modeling process flow for providing a detailed 3D human shape model for a pose prediction.

FIG. 1D illustrates an exemplary modeling process flow for providing a detailed 3D human shape model for a pose prediction (exemplified as a skeleton pose in FIG. 1D). This process may be applied to each of the pose predictions. Plural (K) laser scan data/models represents detailed 3D data obtained from scanning K humans of various body types. These are transformed into K different body type 3D models by use of a generic 3D human mesh shape model (which is transformed to match the scan models of the K humans. The K different body type detailed 3D models may be mapped to the coarse 3D human shape model to obtain the detailed human shape model. FIG. 1E illustrates an option where the mapping of the K different body type detailed 3D models includes modification of certain aspects of the different body type detailed 3D models.

In a further embodiment, the modeling may not only include human body parts (comprising the coarse, different body type detailed and detailed 3D human models), but may also include accessories. Accessories may include a backpack, a briefcase, a purse, a handheld suitcase, a wheeled suitcase that can be pulled via a rod or strap, umbrella, etc.). These accessories may be treated as if they were a human body part and form additional models to which to map and compare to the features extracted from the video images.

Taking a backpack as an example, when mapping cylindrical body parts to the 3D skeleton (representing a pose), in addition to generating coarse 3D human shape models without accessories, the 3D pose refinement module 105 may also generate one or more coarse 3D human-backpack combination shape models. The coarse 3D human-backpack combination shape models may include a cylindrical based human shape model along with a simple geometric volume (e.g., a cylinder or parallelepiped) with a location estimated by fitting the coarse 3D human-backpack combination shape model within the visual hull extracted by module 103. 3D shape estimation may similarly match a detailed 3D backpack model (e.g., a mesh type model) to the backpack element of the coarse 3D human-backpack combination shape model. The detailed 3D backpack models (as well as other detailed 3D accessory models) may be separately obtained (e.g., derived from separate scans) and separately stored from the different body type detailed 3D human shape models, with all combinations of the detailed 3D backpack models and the different body type detailed 3D human shape models being possible detailed 3D human-backpack models to be provided by module 106 to 3D shape estimation module 107.

If the human object does not include a backpack, in most scenarios, an associated calculated probability with the 3D human-backpack combination models (coarse and detailed models in connection with the refined pose hypotheses output by module 105 and in connection with determining the final estimation output by module 107, respectively) will be low and may be disregarded in further calculations. If the human object does include a backpack, in many scenarios, the probability associated with the 3D human-backpack combination model (coarse and detailed) will result in a higher probability than those 3D human models (coarse and fine) without a backpack. Selection of a 3D human-backpack model as the final shape estimation output by module 107 identifies the human object in the video as including a backpack accessory.

In this alternative, accessory modeling may be estimated starting with module 105 in the video surveillance system 101 of FIG. 1A. That is, pose prediction module 104 may not include any pose representation of an accessory and introduction of the accessory module as a possibility may initiate with 3D pose refinement module 105, as described above. However, in many cases, the relationship between the human skeleton and accessory may be dynamic. For example, when the accessory is a pull-type wheeled suitcase, the angle at which this suitcase extends from the hand of a human may vary. It may be beneficial to provide pose predictions from pose prediction module 104 to include accessory elements to the pose predictions, comprising an estimated axis and length of the accessory, along with a 3D location. In this example embodiment, an estimated axis, length and/or location of the accessory may be used by the 3D pose refinement module 105 to map a simple geometric shaped accessory (or other more complex model) in creating the coarse 3D human-accessory combination model. These coarse 3D human-accessory combination models are provided together with coarse 3D human shape models (without accessories), both of which are associated with a corresponding calculated probability (which may be used to determine likelihood of an accessory or not in further analyses by the video surveillance system, as described herein).

In some embodiments, accessories may be detected by detecting significant anomalies between the 3D human model and the video image(s) of the video streams. For example, in module 105, when mapping cylindrical body parts to skeleton parts provided by pose prediction module 104, the shape fitting calculations may reveal difficulty in finding a proper fit for a torso cylinder and the 3D visual hull extraction. In certain cases, the anomaly may be so great that the calculations may be altered to ignore certain portions of the 3D visual hull associated with the anomaly in further calculations for that model. For example, FIG. 1B at (d) shows an extracted 3D visual hull including a backpack (middle right of the models) which has been disregarded in creating the coarse 3D human models. Similarly, silhouette portions corresponding to the anomaly may be disregarded by module 107 in mapping the different body type detailed 3D human models provided by module 106 to the coarse 3D module. The final estimated pose and shape of the detailed 3D human model output by 3D shape estimation module 107 may be used to analyze (e.g., determine size and/or identify) the anomalous shape. For example the final estimated detailed 3D human model may be subtracted from the 3D visual hull and the anomaly may be modeled therefrom. As another example, the final estimated 3D human model may be used to calculate corresponding silhouette(s) on one or more image planes of the video images (e.g., by projecting the estimated 3D human model onto these image planes). The calculated silhouette(s) may be compared to corresponding extracted silhouette(s) extracted from the video images to analyze the anomalous shape.

Taking an example of a human with a backpack, the backpack may identified as an anomalous shape and removed from estimations in creating the coarse 3D human models and creating the detailed 3D human models. After obtaining the final estimated 3D human model in a manner described herein, the final 3D human model may be projected onto each of the video image planes to obtain a calculated silhouette for each of these images planes (the image planes may correspond to each of the video images of the video streams taken by the various video cameras monitoring the desired location). In addition, a video image of each of the video streams may be analyzed to extract a silhouette of the detected human object. For example, the background of each video image may be subtracted to obtain the human object and from there derive a corresponding extracted silhouette for each of the image planes. For each image plane, the calculated silhouette may be subtracted from the extracted silhouette to obtain a silhouette of the accessory. The accessory silhouette and its associated location may be analyzed to identify and determine its characteristics. In this example, the accessory may be identified as being located at a location near the back of the human object. The size of the accessory silhouette may be analyzed to determine it corresponds to a typical size of a backpack. Thus the accessory may be identified as a backpack and its size estimated.

The following provides description of certain detailed examples, which may be implemented by the video surveillance system 101 of FIG. 1A. It should again be emphasized that the details below are exemplary in nature and may be skipped or replaced with other approaches according to certain embodiments. Module 102 may provide streams of multi-view image sequences of a human target from a set of calibrated cameras as inputs. 3D volumetric reconstruction (visual hull) of the target is obtained by module 103 using space carving from the target silhouettes. Bottom-up predictors may be used by module 104 to generate initial hypotheses of the articulated 3D pose of the human independently from each sensor and fuse them at the semantic 3D pose level.

The 3D pose may be refined by module 105 using top-down (generative) methods using Markov Chain Monte Carlo (MCMC) based search to efficiently fit a coarse 3D human shape model (e.g., with cylindrical body parts) to the extracted visual hull. The top-down models are used to search in both pose and parametric space of skeleton and coarse 3D human shapes to maximize the overlap with the visual hull. The space of detailed human shape variation may be modeled using Principal Component Analysis (PCA) in module 106. Human 3D shape model may be learned by first establishing one-to-one correspondence between a hole-filled, template 3D mesh model and a corpus of human body scans (e.g., to obtain different body type 3D models), such as human body scans provided from CAESAR Dataset. The registered 3D mesh data is used to learn low-dimensional models for local parts-based and global shape variability in humans. Detailed 3D shape of a target human is obtained by module 107 by searching in the PCA-based low-dimensional parametric shape space for the best fitting match. For example, plural detailed 3D human models (obtained by mapping human body scans to the coarse 3D human shape models) may have a silhouette calculated and compared to a silhouette of the human target extracted from one or more video streams.

Video surveillance system 101 may analyze 3D human shapes and infer attributes of the human target such as gender and dimensions of their body parts. Three, four or more calibrated cameras may be placed along directions to maximally capture the entire viewing sphere around the target.

The human body may be modeled as a combination of an articulated skeleton and 3D shape. The shape may be modeled both coarsely (using cylindrical parts) and finely (using detailed 3D surface mesh). 3D shape models are also learned for both entire human body and individual body parts (e.g., 15 components). It performing analyses, it may be assumed that the human body shape gets deformed only due to the underlying skeleton (and not due to other factors such as clothing).

In this example, targets are localized using change detection. Background pixel intensity distribution may be modeled as non-parametric kernel density estimate to extract silhouettes of moving targets. Image streams from multiple calibrated sensors may be used to reconstruct 3D volumetric representation (visual hull) of the human target using space carving. Octree-based fast iterative space carving algorithm may be used to extract volumetric reconstruction of the target. A single volume (cube) that completely encloses the working space of the acquisition system may be defined. Based on the projection to the camera image plane, each voxel is classified as inside, outside or on the boundary of the visual hull using the target silhouette. The boundary voxels may be iteratively subdivided into eight parts (voxels) until the size of voxels is less than the threshold size.

As 2D shapes of the silhouette are used in discriminative 3D pose prediction, a visual hull is back projected to obtain clean silhouettes of the target using Z-buffering. The improved silhouettes generate cleaner shape descriptors for improved 3D pose estimation using bottom-up methods.

Laser scans of human body, e.g., from CAESAR dataset, may be used to learn parametric models for 3D human shapes. Human body scans are first registered to a hole-filled, reference template human model composed of both 3D mesh surface and accurately aligned skeleton. A detailed template model of standard anthropometry may be used to capture subtle and wide range of variations in human 3D shapes. The CAESAR dataset has 73 landmark points on various positions, and these are used to guide the 3D shape registration. The deformation is an iterative process that gradually brings the template surface mesh vertices (and the skeleton) close to the laser scan data points by translating them along surface normal while maintaining the surface smoothness.

Figure 3C:
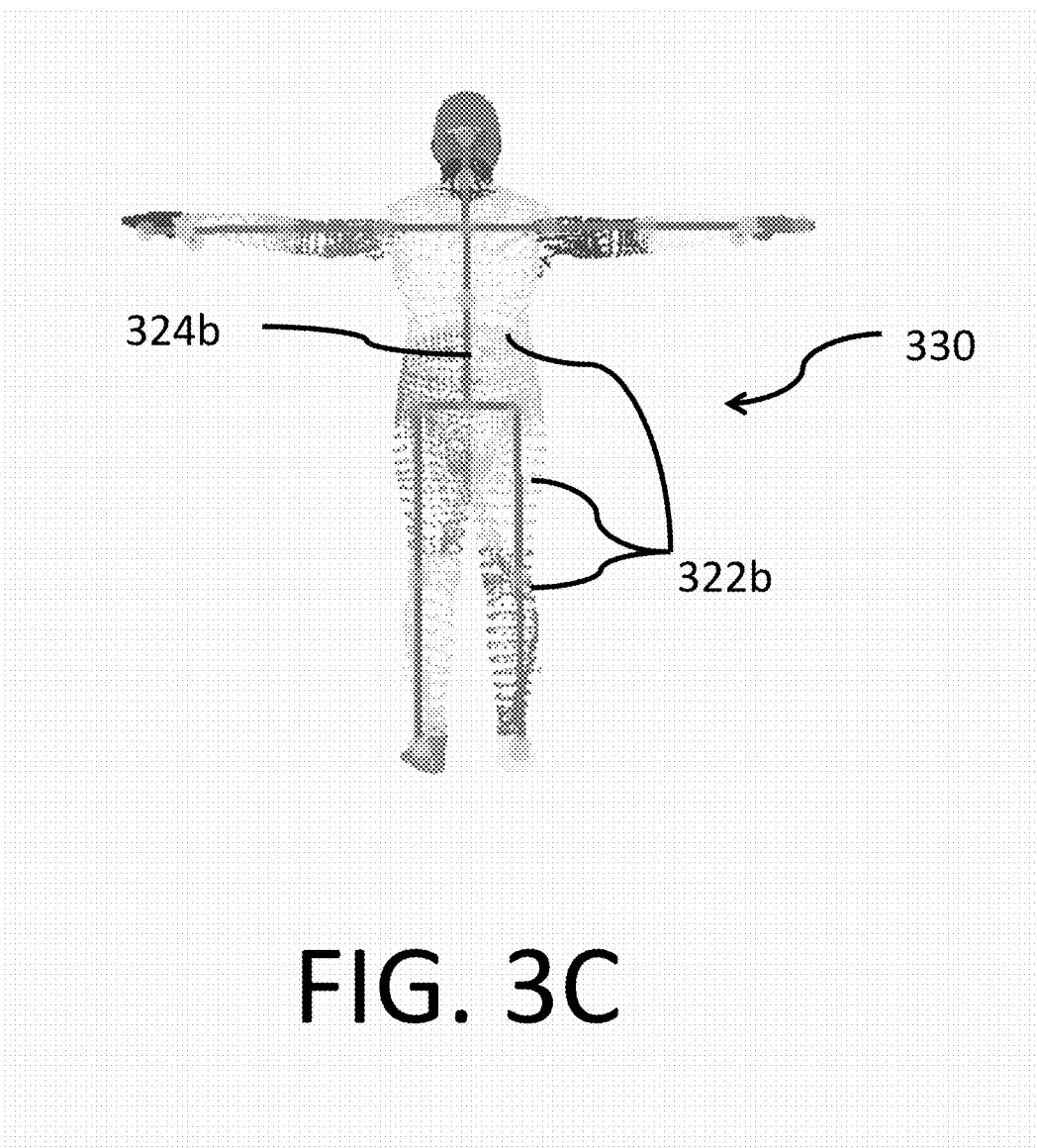
FIG. 3C illustrates an average detailed shape model.
Figure 3D:
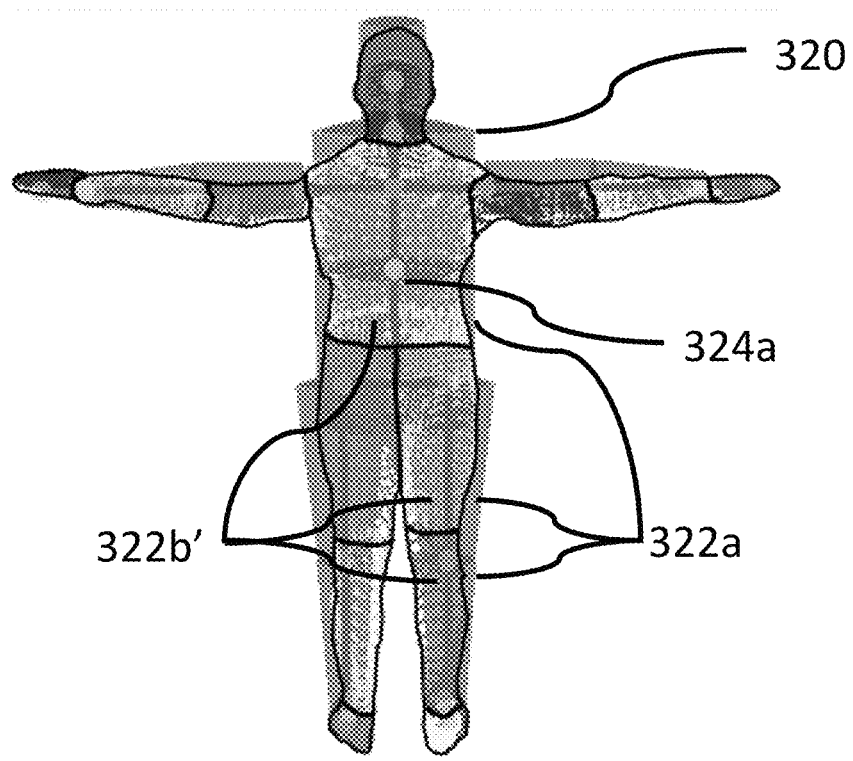
FIG. 3D illustrates body parts of a body type detailed 3D model mapped to cylindrical body parts.

Parametric models for the space of human skeletons and coarse representation of 3D shape of the human body L using cylindrical parts may be generated. FIG. 3A illustrates an example of the space of articulated human skeletons 310. FIG. 3B illustrates an example of a course 3D human shape model 320 comprised of a plurality of cylindrical body parts 322a individually mapped to align with segments of a skeleton 324a. Mapping of such cylindrical body parts 322a may be performed by module 105 to refine the pose hypotheses, as discussed herein. Cylindrical body parts 322a shown in FIG. 3B includes parts for head, upper torso, lower torso, forearms, biceps, thighs, calves, feet and hands. FIG. 3C illustrates an average detailed shape model 330, which may be a body type detailed 3D model provided by human shape models module 106. Parts 322b of the body type detailed 3D model 330 are mapped to align with the average skeleton 324b in FIG. 3C. FIG. 3D illustrates body parts 322b' of the body type detailed 3D model 330 mapped to the cylindrical body parts 322a of the coarse 3D human shape model 320. The size of the body parts 322' may be estimated from the cylindrical body parts 322 on a part by part basis. Principal Component Analysis (PCA) is used to learn the space of human skeletons and variability of dimensions of the cylindrical body parts from the registered CAESAR dataset. FIG. 2 shows an example of a 3D shape registration where a 3D mesh surface and underlying skeleton of a template human model is iteratively deformed to align the 3D mesh surface and underlying skeleton to human body scan data (CAESAR scan data). In one example, the space of human skeletons is parameterized using 5 dimensional PCA subspace, capturing 94% of the variability in length of skeletal links. The coarse 3D human shape model parameters L=[l $r_1$ $r_2$] include the length and the two radii of the tapered cylindrical human parts.

The space of human body shapes and the individual body parts may be characterized using Principal Component Analysis (PCA). As compared to global 3D human shape models parts based 3D shape models may assist in modeling asymmetries and surface protrusions (e.g., arising due to object concealment). PCA may be used to learn subspace for each of the body parts from the parts vertices of the registered shape, that may be in one-to-one correspondence with the pre-segmented template mesh model.

Detailed 3D body parts may be obtained from the coarse cylindrical body parts. The relation between the PCA coefficients of the $i^{th}$ body part and dimensions of its corresponding cylindrical shape model ($L^{(i)}=[l^{(i)}\ r_1^{(i)}\ r_2^{(i)}]$) may be learned. Specifically, a linear regression map may be learned from the PCA coefficients $[P]_{N \times k}$ of the N data points in k-dimensional PCA subspace. For the regression function:

$$M[l^{(i)} r_1^{(i)} r_2^{(i)} 1]^T = [P_1^{(i)} \ldots P_k^{(i)}]^T$$

The mapping is learned as a pseudo-inverse:

$$M = P(LL^T + \lambda I)^{-1} \quad (1)$$

where $\lambda$ is the regularization constant of the ridge regression. The PCA coefficients of the detailed 3D shape of the ith body part can be directly computed from the dimensions of cylindrical body part as $M[l^{(i)}\ r^{(i)}\ r^{(i)}\ 1]$.

Due to high degree of articulation of human body, searching in high dimensional pose space may be prone to local optima. Initializing the search near the global optima using discriminative (bottom-up) methods may address this issue. To this end, a regression based framework may be employed to directly predict multiple plausible 3D poses (obtained as probabilistic distribution over pose space) using the visual cues extracted from individual sensors. The predictive distribution from multiple sensors are then obtained by simple summing these distributions. Inferring 3D pose using only 2D visual observation may be problematic due to loss of depth information from perspective projection. Learning may therefore involve modeling inverse perspective mapping that is one-to-many, as several 3D human configurations can generate similar 2D visual observations. These relations as multi-valued mappings may be modeled using Bayesian Mixture of Experts (BME) model. Formally, the BME model is:

$$p(x|r) = \sum_{i=1}^{M} g_i(r) p_i(x|r) \quad (2)$$

$$g_i(r) = \frac{\exp(\lambda_i^T r)}{\sum_k \exp(\lambda_k^T r)} \quad (3)$$

$$p_i(x|r) = N(x|W_i r, \Omega_i^{-1}) \quad (4)$$

where r is the input or predictor variable (image descriptors), x is the output or response (3D pose parameters), and $g_i$ is the input-dependent positive gate functions. Gates $g_i$ output value between [0, 1] and are computed using (3). For a particular input r, gates output the probability of the expert function that should be used to map r to the output pose x. In the model, $p_i$ refers to Gaussian distributions with covariances $\Omega_i^{-1}$ centered at different "expert" predictions. BME is learned in Sparse Bayesian Learning (SBL) paradigm that uses Automatic Relevance Determination (ARD) mechanism to train sparse (less parameterized) models of regression. An accelerated training algorithm based on forward basis selection may be used to train our discriminative models on a large database of labeled poses observed from different viewpoints.

In multi-camera settings, visual cues can be fused at feature level to train a single discriminative model to predict 3D pose using concatenated feature vector obtained from multiple sensors. However, such a model will be dependent on the camera configurations. Plural 3D poses may be predicted from a single camera by training an expert model to predict these poses with training examples captured from multiple viewpoints. We use this model to predict poses from each of the video camera viewpoints independently. Such pose predictions may be performed by module 104. The combined predictive distribution is obtained by simply summing the mixture of Gaussian distributions obtained from each of the sensor models $C=\{C_1, \ldots, C_N\}$ with gate weights re-weighted to sum to one:

$$p(x|r, W, \Omega, \lambda) = \sum_{C_j}^{N} \sum_{i=1}^{M} g_{ij}(r|\lambda_{ij}) p_{ij}(x|r, W_{ij}, \Omega_{ij}^{-1}) \quad (5)$$

where N is the number of sensors and M are the experts in each of the Mixture of Experts model used to learn the mapping.

Generative (top-down) model based feedback stage may be used to further refine the 3D pose estimates obtained from bottom-up methods in module 104. A generative model may comprise a coarse 3D human shape model with each body part represented using simple geometric primitive shapes such as tapered cylinders. Geometric shapes allow fast image likelihood computation and help avoid non-self penetration constraint for the body parts. The top-down search fits the human model to the visual hull by optimizing the parameters of the human skeleton model (5 dimensional), coarse 3D shapes (5 dimensional) and joints angles ($\approx 15$ after variance based pruning). Predictive distribution from the feed-forward methods to prune the joint angles having low variance. A likelihood value is calculated for each of the cylinders for skeleton parts of each of the pose estimates to determine the best fit of the tapered cylinders to the visual hull by selecting optimal radii $R_1$ and $R_2$ of the tapered cylinder (a length of the tapered cylinder may correspond to the length of the skeleton part to which the tapered cylinder is being mapped. The likelihood cost is computed as the sum of degree of overlap of each part to the visual hull with an added cost for each pair of intersecting parts. In computing the self-penetration cost, the shortest distance D between the two axes of the cylindrical body parts of radii $R_1$ and $R_2$ is calculated. For the two intersecting parts, a penalty term proportional to $(R_1+R_2-D)$ is added in the likelihood function.

FIG. 4 illustrates aspects of mapping cylindrical body parts to a pose described by skeleton 412 which may be performed by module 104. Skelton 412 may have its root joint 412a aligned with the centroid of the visual hull 414. The plural cylindrical body parts combine to form a coarse 3D human shape model 420. Overlap cost is compute as the number of voxels (visual hull elements) that lie inside the cylindrical body part. Parts self intersection is penalized by adding an additional cost proportional to $(R_1+R_2-D)$ for every self-penetrating part. Corresponding likelihood costs are assigned to each of plural poses (represented by the coarse 3D human shape model with skeleton 412) and used to describe or obtain pose hypotheses that may later be refined.

Stochastic Optimization may be performed using Markov Chain Monte Carlo (MCMC) simulation for searching in the parameter space of the human skeletal links (L), the coarse shape models (S) and 3D pose (θ). MCMC is a suitable methodology for computing a maximum a posterior (MAP) solution of the posterior argmax$_x$p(x|r) by drawing samples from the proposal density (that approximates the posterior) using a random walk based Metropolis algorithm[14]. At the $t^{th}$ iteration, a candidate $x^i$ is sampled from a proposal distribution q(x'|x$_{t-1}$) and accepted as the new state with a probability a(x$_{t-1}$→x') where:

$$a(x_{t-1} \to x') = \min\left\{1, \frac{p(x'|r)q(x_{t-1}|x')}{p(x_{t-1}|r)q(x'|x_{t-1})}\right\} \quad (6)$$

where x'={L, S, θ} are the parameters which are optimized to maximize the overlap between the coarse 3D human model and visual hull. Here S denotes the low-dimensional PCA coefficients of anthropometric prior. In order to avoid local optima, we use simulated annealing that gradually introduces global optima in the distribution to be maximized p(x|r)$^{1/Ti}$. The parameter T$_i$ is gradually decreased under the assumption that p(x|r)$^∞$ mostly concentrates around the global maxima[10].

The proposal distribution (or proposal map) in the MCMC search is assumed to be independent for shape and pose parameters. Metropolis algorithm may be used for sampling the proposal map in the MCMC search that are not conditioned on the current state x$_{t-1}$. The proposal distribution q(θ) may be obtained as mixture of Gaussians from the bottom-up predictors (5) and may be ill-suited for searching in the joint angle space. Sampling from the angular priors of the joints higher in the skeletal hierarchy (such as shoulder and femur joints) may produce larger spatial motion compared to the lower joints (such as elbow and knee joints). Optimizing simultaneously in the entire 3D pose space may cause instability and more iterations for convergence. This problem may be resolved by fitting joints higher in the skeletal hierarchy first. The spatial prior may be sampled from as opposed to angular prior. Specifically, for the $i^{th}$ skeletal link, we sample from the p(θ$_i$, Σ$_{θi}$)=N(F(θ$_i$), Σ$_F$) and F(θ$_i$)=F(θ$_i^{(p)}$)*R(θ$_i$)+T(θ$_i$) where F(θ$_i$) is the I end location of the $i^{th}$ joint link and θ$_i^{(p)}$ is its parent joint. Sampling from F(θ$_i$) is not straight forward as unlike θ$_i$, it spans non-linear manifold M. In order to compute the covariance, the manifold at a point by the tangent space at that point may be linearly approximated. The jacobian J may be computed and used it to compute covariance as Σ$_F$=J$_{θi}$Σ$_{θi}$J$^T_{θi}$. At $t^{th}$ iteration, sampling from the distribution N(F(θ$_i$), Σ$_F$) generates locations of end-effectors of the joints that is used to compute the angle by minimization of the function:

$$\theta_i^{(t)} = \min_{\theta_i} \|F(t) - F(\theta_i)\|^2 \text{ s.t. } \theta_i^{min} \le \theta_i \le \theta_i^{max} \quad (7)$$

(7) The minimization is performed using standard Levenberg-Marquardt optimization algorithm.

Detailed 3D shape estimation may be performed by module 107. 3D pose and coarse shape, estimated from top-down method, is used to initialize the search in parameter space of detailed 3D human shapes. 3D shape of humans may be modeled using polygonal 3D mesh surfaces skinned to an underlying skeleton. The 3D mesh surface may be assumed to undergo deformation only under the influence of the skeleton attached to it. Shape of human body can vary both due to anthropometry or the pose of the target. Anthropometric variability may be modeled by the learned 3D shape models for humans. The shape deformation due to pose may be obtained by first skinning the 3D mesh to the skeleton and transforming the vertices under the influence of associated skeletal joints.

Linear Blend Skinning (LBS) may be used for efficient non-rigid deformation of skin as a function of an underlying skeleton. LBS is achieved by associating the vertices to two nearest joints. The transformation is computed as weighted sum of the transformation due to each of the joints where weights are computed as inverse distance from the joints. FIG. 5 illustrates the computation of the transformation of vertices associated to different body segments. Linear Blend Skinning may be used to deform the 3D mesh under the influence of the skeleton, as shown in the detailed 3D human models 502, 504 and 506 in FIG. 5. Rigidly deforming human body parts causes artifacts around the joints as shown by the model 502 in the left. Vertices may be transformed using weighted sum of transformation due to multiple associated joints. Shape deformation may also be achieved with a human-accessory combination model, as shown with the model 504 on the right including backpack accessory 508 attached to the torso Although rich in terms of representation, global 3D human shape representation is problematic in modeling 3D shapes with disproportionately sized body parts. In order to support a rich set of human shapes, a combined local part-based and global optimization scheme may be used that first searches in the local subspace of human body parts to match the observation, followed by constraining the whole shape using global human shape model. Fitting body parts independently causes discontinuities along the joints and may generate unrealistic shapes. Constraining the shape to lie in the global shape space therefore ensures it to be a valid shape. For linear PCA based shape models, this is efficiently done by ensuring the PCA coefficients of the shape (when projected to the subspace) to lie within a range of variance. FIG. 6 illustrates an example of detailed 3D shape fitting by sampling from PCA based shape models of various body components, including an human shape model 602 (which may be one of the different body type detailed 3D models), a shape 604 with each body part sampled from the parts shape model (e.g., an initial version of the detailed human shape model), and a 3D shape 606 obtained after constraining the shape using a global shape model (e.g., a final version of the detailed shape model). Discontinuities (such as gaps and/or caused by imperfect part end matching) may be observed in the shape 604, such as at shoulder locations 604a, at elbow location 604b and at knee location 604c. The discontinuities may arise from imperfect fitting due to the individual part by part mapping of the human shape model 602 to the coarse 3D human shape model (not shown). The discontinuities may be removed by smoothing the skin mesh of shape 604 (such as by interpolating between neighboring surface mesh elements) to obtain the smooth global shape model 606.

An alternate search in the parameter space of 3D human pose (θ) and shape (S) may be performed to simultaneously refine the pose and fit detailed 3D shape to the observation. The search may be performed using Data Driven MCMC with metropolis-hasting method wherein the proposal map does not use the predictive distribution obtained from bottom-up methods but rather is modeled as Gaussian distribution conditioned on the current state q(x'|x$_{t-1}$) where x$_{t-1}$={θ$_{t-1}$, S$_{t-1}$}. The likelihood distribution is modeled as extent of overlap between the projected 2D silhouette of the model and the observed image silhouettes from multiple sensors (see, e.g., FIG. 7 (d)).

Likelihood of matching a hypothesis to the observation may be computed as a normalized overlap cost of the rendered 2D silhouette (e.g., a calculated silhouette obtained by projecting the detailed 3D human model onto the appropriate image plane) and observation (e.g., a silhouette extracted from the video image that corresponds to the human object). FIG. 7 illustrates images that from left to right show (a) the input image; (b) the silhouette extracted from the input image using background subtraction; (c) the rendered 2D silhouette of a 3D pose hypothesis projected onto the image lane of the input image and; (d) overlap of the rendered silhouette with the observed silhouette.

The current 3D shape may be used to search in the parameter space of articulated human pose to optimize the 3D pose. The regression function M (1), that maps the coarse human shape model to the detailed shape PCA coefficients, may be used to initialize the search. Plausible 3D shapes are sampled from the Gaussian distributions that the PCA based sub-space represents for each of the body parts. The search may be performed by alternately fitting the 3D pose first, followed by optimization of the shape parameters of the individual body parts. At every iteration, the 3D shape of human body may be constrained using global shape model to ensure a valid shape.

Figure 8:
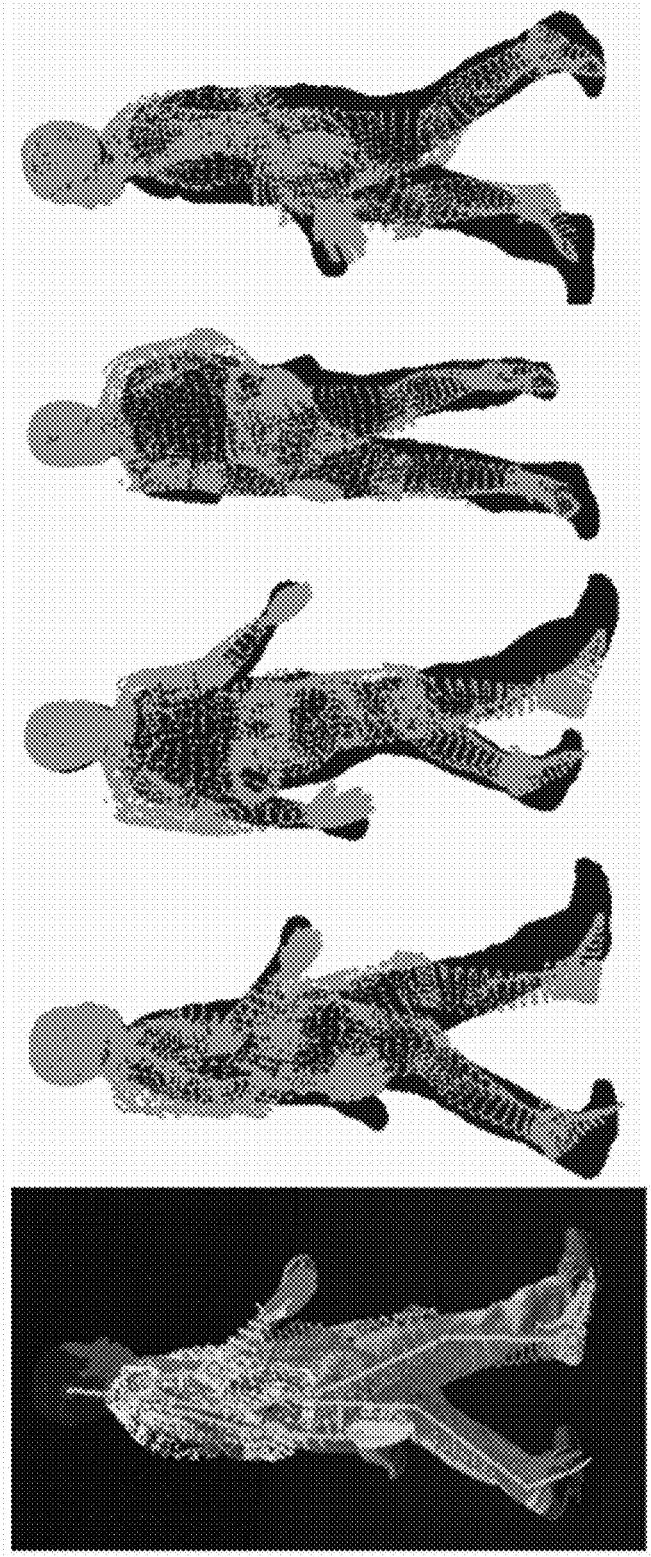
FIGS. 8 and 9 illustrate exemplary results of human shape modeling.
Figure 9:

FIGS. 8 and 9 illustrates the results of human shape modeling according to embodiments here in on walking sequences with and without a backpack. 3D surface reconstruction of a human body is provided for plural poses. 3D shape fitting algorithms are evaluated by matching the fitted 3D shape (shown as mesh) with the ground truth surface reconstruction (shown as solid).

Linear discriminant analysis (LDA) may be used to find the feature projections that best discriminate the shape profiles of the two gender classes. Linear Discriminant Analysis (LDA) essentially learns a linear classification boundary between the two classes under the assumption that the samples from each of the two classes are normally distributed. The LDA vector can be used to classify a person's gender based on the fitted 3D shape. Similar to gender classification, age and ethnicity attributes of a person can be inferred depending on the body stature. FIG. 10A shows the gender classification results using LDA. Here the threshold for gender classification is set to 0 and negative LDA coefficients denote female shapes.

Figure 10B:
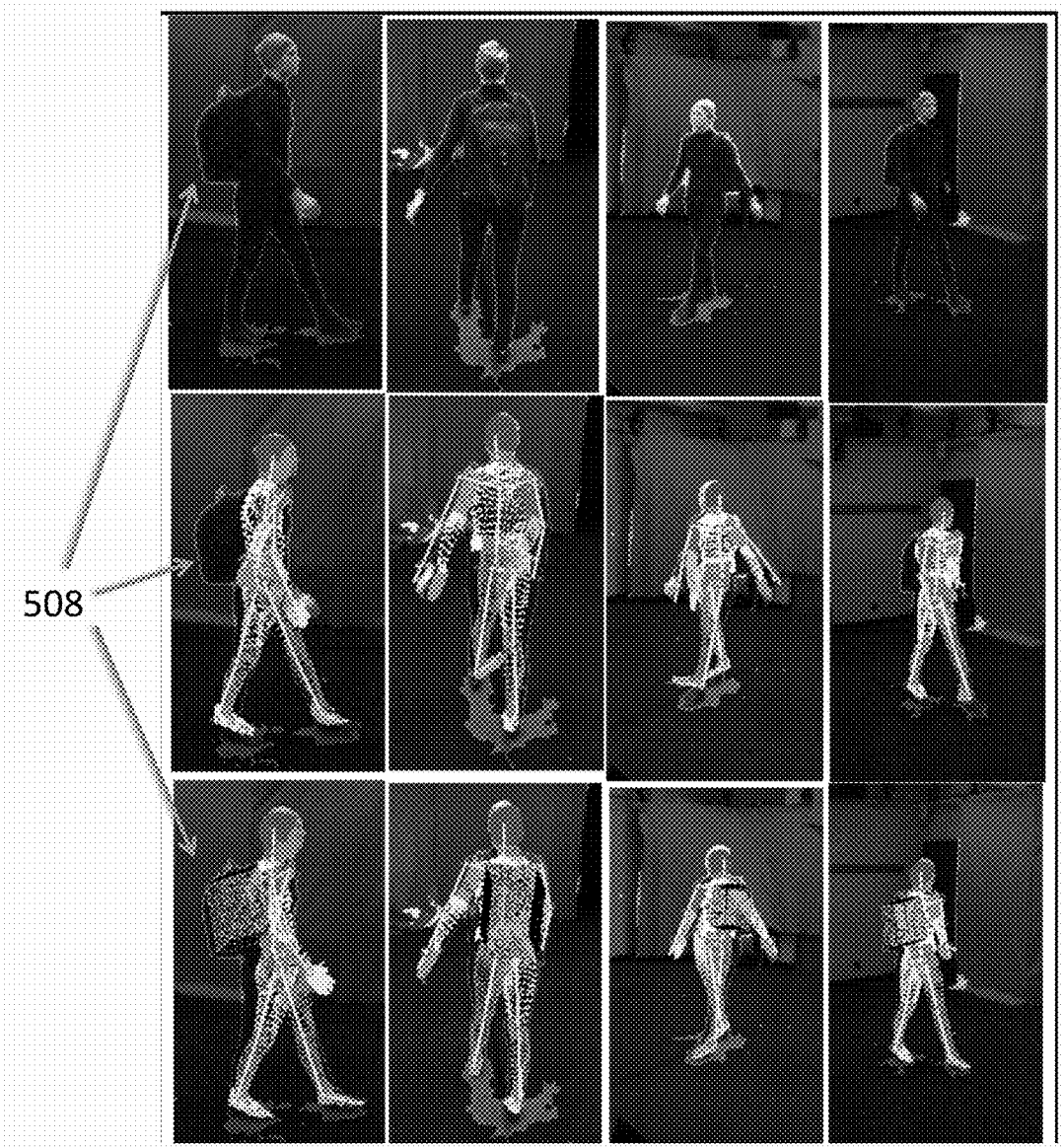
FIG. 10B illustrates use of a model with an attached accessory.

The video surveillance system 101 also supports automatic estimation of size of an accessory bag carried by humans. Backpack may be modeled as a trapezoidal shape or other simple geometric shape and is assumed to be rigidly attached to the torso such that the translation and orientation of the backpack can be directly computed using that of torso. The two parameters of the trapezoid (thickness and orientation of non-perpendicular face) are iteratively estimated during the 3D shape fitting. The shape of the accessory is initialized to mean thickness of human torso. The framework functions as a generative classifier to identify whether a human is carrying backpack or not. Improvement in the likelihood of fit for the model with the attached accessory implies presence of backpack. This is illustrated in FIG. 10B whereby use of model with an attached accessory (backpack 508) improved the likelihood of fit from a likelihood calculation of 1.043 to 1.3441.

The estimated 3D shape of the human target can be used for inference of a variety of human attributes that are useful for identifying a potentially hostile behavior. Demographic features such as gender and ethnicity, physical attributes such as height, weight and body appearance can be inferred either by computing spatial statistics of different regions of the fitted 3D shape or by determining anthropometric variations that characterizes these features. Various anthropometric measurements can be directly inferred from the 3D shape fitting to the observed multi-sensor data. FIG. 10C shows the measurements (here, width and length) of different body parts estimated from the 3D shapes fitted to the observations.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. For example, although the disclosure has described use of multiple cameras to obtain video streams to extract a visual hull, use of a single camera is also contemplated. Extraction of a visual hull with a single camera may be assisted with depth information from a depth sensor. Human models may be compared to image features (e.g., visual hull or silhouette) that may be obtained over multiple frames. Another example, the description is focused on modeling humans based on detected human objects in a video. However, other objects may be modeled (e.g., animals or vehicles) in accordance with the embodiments described herein which may be used to detect associated characteristics and events.

What is claimed is:

1. A method of video analysis, comprising:
   receiving plural video streams, each video steam providing a series of video images of a monitored location;
   detecting a human object within the video images;
   determining a three dimensional (3D) hull corresponding to the human object within the video images;
   determining initial pose hypotheses of the human object within the video images, the initial pose hypotheses comprising a plurality of pose predictions associated with a particular instant in time, each of the plurality of pose predictions associated with a corresponding first probability value;
   mapping a plurality of simple geometric volumes to each of the pose predictions of the initial pose hypotheses to obtain a plurality of corresponding coarse 3D human models;
   comparing each of the corresponding coarse 3D human models to the 3D hull;
   in response to the comparing of each of the corresponding coarse 3D human models to the 3D hull, modifying pose predictions of the initial pose hypotheses to obtain refined pose hypotheses;
   for each of the pose predictions of the refined pose hypotheses, mapping at least one standard human model to a coarse 3D human model associated with the pose prediction to obtain an associated refined 3D human model;
   comparing each of the refined 3D human models to at least one of the video images to select an optimum 3D human model as representing the human object detected within the video images; and
   based on the selected optimum 3D human model, automatically detecting at least one of an event represented within at least one of the video images, a characteristic of the human object and a second object within at least one of the video images.

2. The method of claim 1, wherein the 3D hull is represented as a three dimensional volume.

3. The method of claim 1, wherein mapping the plurality of simple geometric volumes to each of the pose predictions comprises mapping a body part geometric volume to a corresponding portion of a pose of the pose prediction.

4. The method of claim 1, comprising automatically detecting an event represented within at least one of the video images based on the selected optimum 3D human model.

5. The method of claim 1, wherein at least some of the coarse 3D human models comprise an accessory model part.

6. The method of claim 1, further comprising, for at least some of the coarse 3D human models, obtaining a coarse 3D human-accessory model by mapping an accessory simple geometric volume to a position correlated to a pose of the corresponding pose prediction.

7. The method of claim 1, wherein each pose prediction of the initial pose hypotheses comprises a pose describing 3D orientations of human body parts, a 3D orientation of an accessory, and a probability associated with the corresponding pose.

8. The method of claim 7, wherein the 3D orientations of human body parts and the accessory of each pose is represented by a skeleton model comprising plural skeleton body segments and an accessory segment, each segment of the skeleton model being associated with 3D coordinates describing an associated 3D orientation.

9. The method of claim 1, comprising automatically detecting a second object within at least one of the video images based on the selected optimum 3D human model.

10. The method of claim 9, wherein automatically detecting a second object comprises detecting an accessory object attached to the human object.

11. The method of claim 1, comprising automatically detecting a characteristic of the human object based on the selected optimum 3D human model.

12. The method of claim 11, wherein the detected characteristic comprises a size of the human object.

13. The method of claim 11, wherein the detected characteristic comprises a gender of the human object.

14. The method of claim 11, wherein the detected characteristic comprises a race of the human object.

15. The method of claim 11, wherein the detected characteristic comprises an age of the human object.

16. The method of claim 1, further comprising, for each of the pose predictions of the refined pose hypotheses, mapping plural standard human models to the coarse 3D human model associated with the pose prediction to obtain plural associated refined 3D human models for each pose prediction of the refined posed hypotheses, each of the plural standard human models representing a different human body type.

17. The method of claim 16, wherein comparing each of the refined 3D human models to the at least one of the video images to select an optimum 3D human model as representing the human object detected within the video images comprises:
for each of the refined 3D human models, calculating a first silhouette by projecting a corresponding refined 3D human model from a three dimensional space to a two dimensional image plane of a first video image of the video images;
for each of the refined 3D human models, calculating a second silhouette by projecting the corresponding refined 3D human model from the three dimensional space to the two dimensional image plane of a second video image of the video images;
extracting a first extracted silhouette from the first video image;
extracting a second extracted silhouette from the second video image;
comparing the first silhouette to the first extracted silhouette; and
comparing the second silhouette to the second extracted silhouette.

18. The method of claim 16, wherein comparing each of the refined 3D human models to at least one of the video images to select an optimum 3D human model as representing the human object detected within the video images comprises:
calculating a silhouette of each of the refined 3D human models;
extracting a silhouette from a video image of the video image streams; and
comparing the calculated silhouettes to the extracted silhouette.

19. The method of claim 18, wherein calculating the silhouette of each of the refined 3D human models comprises projecting a corresponding one of the refined 3D human models from a three dimensional space to a two dimensional image plane of one of the video images.

20. The method of claim 1, wherein each pose prediction of the initial pose hypotheses and the refined pose hypotheses comprises a pose describing 3D orientations of human body parts and a probability associated with the corresponding pose.

21. The method of claim 20, wherein modifying pose predictions of the initial pose hypotheses to obtain the refined pose hypotheses comprises:
selecting a sub-set of the pose predictions of the initial pose hypotheses to form pose predictions of the refined pose hypotheses.

22. The method of claim 20, wherein modifying the pose predictions of the initial pose hypotheses to obtain the refined pose hypotheses comprises:
modifying at least some first probability values associated with the pose predictions of the initial pose hypotheses to obtain second probability values, each of the second probability values being associated with a corresponding pose prediction of the refined pose hypotheses.

23. The method of claim 20, wherein the 3D orientations of human body parts of each pose is represented by a skeleton model comprising plural skeleton body segments, each skeleton body segment of the skeleton model being associated with 3D coordinates describing an associated 3D orientation.

24. The method of claim 23, wherein the mapping of the at least one standard human model to the coarse 3D human model is performed on a part by part basis.

25. The method of claim 23, wherein the plural skeleton body segments of the skeleton model are connected to each other at joint locations.

26. The method of claim 23, wherein mapping the at least one standard human model to the coarse 3D human model comprises:
for each of the pose predictions of the refined pose hypotheses, mapping a body part of the at least one standard human model to a corresponding geometric volume of the coarse 3D human model.

27. The method of claim 26, wherein the mapping of the body part of the at least one standard human model to the corresponding geometric volume comprises individual adjustment of the size of the body part of the at least one standard human model.

28. The method of claim 23, wherein mapping the plurality of simple geometric volumes to each of the pose predictions of the initial pose hypotheses to obtain the plurality of corresponding coarse 3D human models comprises:

for each of the pose predictions of the initial pose hypotheses, mapping a body part geometric volume to a corresponding skeleton body part segment for each of the plural skeleton body segments of the skeleton model representing the pose of the corresponding pose prediction.

29. The method of claim 28, wherein mapping the body part geometric volume to the corresponding skeleton body part segment comprises:

mapping the body part geometric volume with different sizes to the corresponding skeleton body part segment; and determining an associated likelihood value.

30. The method of claim 29, wherein the likelihood value is used to adjust a probability associated with the corresponding pose associated with a coarse 3D human model.

31. The method of claim 30, wherein the likelihood value is determined by comparing the corresponding body part geometric volume to the 3D hull.

\* \* \* \* \*